(12) United States Patent
Gao et al.

(10) Patent No.: US 12,726,980 B2
(45) Date of Patent: Sep. 1, 2026

(54) METHOD AND APPARATUS FOR PUCCH TRANSMISSION, TERMINAL AND NETWORK-SIDE DEVICE

(71) Applicant: DATANG MOBILE COMMUNICATIONS EQUIPMENT CO., LTD., Beijing (CN)

(72) Inventors: Xuejuan Gao, Beijing (CN); Qianqian Si, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 355 days.

(21) Appl. No.: 18/555,495

(22) PCT Filed: Mar. 14, 2022

(86) PCT No.: PCT/CN2022/080614
§ 371 (c)(1),
(2) Date: Oct. 13, 2023

(87) PCT Pub. No.: WO2022/218076
PCT Pub. Date: Oct. 20, 2022

(65) Prior Publication Data

US 2024/0205917 A1 Jun. 20, 2024

(30) Foreign Application Priority Data

Apr. 16, 2021 (CN) ......................... 202110413101.1

(51) Int. Cl.

| | |
|---|---|
| ***H04W 72/12*** | (2023.01) |
| ***H04L 27/26*** | (2006.01) |
| ***H04W 72/0446*** | (2023.01) |
| ***H04W 72/1268*** | (2023.01) |
| ***H04W 72/232*** | (2023.01) |

(52) U.S. Cl.
CPC ... *H04W 72/1268* (2013.01); *H04L 27/26025* (2021.01); *H04W 72/0446* (2013.01); *H04W 72/232* (2023.01)

(58) Field of Classification Search
CPC ......... H04W 72/1268; H04W 72/0446; H04W 72/232; H04W 72/21; H04W 72/044;
(Continued)

(56) References Cited

U.S. PATENT DOCUMENTS

| | | |
|---|---|---|
| 2015/0124676 A1 | 5/2015 | Song et al. |
| 2022/0086816 A1 | 3/2022 | Zhang et al. |

(Continued)

FOREIGN PATENT DOCUMENTS

| | | |
|---|---|---|
| CN | 103391583 A | 11/2013 |
| CN | 110278610 A | 9/2019 |
| CN | 111490865 A | 8/2020 |

OTHER PUBLICATIONS

Qualcomm Incorporated, "HARO-ACK enhancement for IOT and URLLC," R1-2101459, 3GPP TSG RAN WG1, #104-e, e-Meeting, Jan. 25-Feb. 5, 2021, 17 pages (Year: 2021).*

(Continued)

*Primary Examiner* — Lan-Huong Truong
(74) *Attorney, Agent, or Firm* — Ladas & Parry, LLP

(57) ABSTRACT

Provided are a method and an apparatus for PUCCH transmission, a terminal and a network-side device. The method includes: determining, by the terminal, a first time unit for a PUCCH transmission on a first carrier; determining, by the terminal, a second time unit for the PUCCH transmission on a second carrier based on the first time unit; and transmitting, by the terminal, a PUCCH in the second time unit on the second carrier, where the first carrier is a carrier where the PUCCH is transmitted before PUCCH carrier switching is performed by the terminal, and the second carrier is a
(Continued)

carrier where the PUCCH is transmitted after the PUCCH carrier switching is performed by the terminal.

20 Claims, 6 Drawing Sheets

(58) Field of Classification Search
CPC ......... H04W 72/0453; H04L 27/26025; H04L 5/001; H04L 5/0053
See application file for complete search history.

(56) References Cited

U.S. PATENT DOCUMENTS

2022/0248397 A1* 8/2022 Huang .................. H04L 1/1861
2022/0329391 A1* 10/2022 Bae ....................... H04L 1/1864

OTHER PUBLICATIONS

NEC, "UE feedback enhancements for HARQ-ACK," R1-2100948, 3GPP TSG RAN WG1, #104-e, e-Meeting, Jan. 25-Feb. 5, 2021, 14 pages (Year: 2021).*

Extended European Search Report for the corresponding European Patent Application No. 22787306.4 issued by the European Patent Office on Apr. 16, 2024.

"Moderator summary #2 on HARQ-ACK feedback enhancements for NR Rel-17 URLLC/IIoT," 3GPP TSG-RAN WG1 e-Meeting, Jan. 25-Feb. 5, 2021, R1-2101818, Agenda item: 8.3.1.1, Source: Moderator (Nokia).

"Discussion on HARQ-ACK enhancements for eURLLC," 3GPP TSG RAN WG1 Meeting #104b-e, R1-2102493, e-Meeting, Apr. 12-20, 2021, Source: ZTE, Agenda item: 8.3.1.1.

"HARQ-ACK Feedback enhancements for URLLC/IIoT," 3GPP TSG RAN WG1 #104-e-bis, R1-2102819, e-Meeting, Apr. 12-20, 2021, Agenda item: 8.3.1.1, Source: Nokia, Nokia Shanghai Bell.

"UE feedback enhancements for HARQ-ACK," 3GPP TSG RAN WG1 #104b-e, R1-2103527, e-Meeting, Apr. 12-20, 2021, Source: NEC, Agenda Item: 8.3.1.1.

International Search Report for PCT/CN2022/080614 issued on May 17, 2022 and its English Translation provided by WIPO.

Written Opinion for PCT/CN2022/080614 issued on May 17, 2022 and its English Translation provided by WIPO.

International Preliminary Report on Patentibily for PCT/CN2022/080614 issued on Oct. 12, 2023 and its English translation provided by WIPO.

* cited by examiner

METHOD AND APPARATUS FOR PUCCH TRANSMISSION, TERMINAL AND NETWORK-SIDE DEVICE

CROSS-REFERENCE TO RELATED APPLICATIONS

This application is the U.S. national phase of International Application No. PCT/CN2022/080614, filed on Mar. 14, 2022, which claims a priority to Chinese Patent Application No. 202110413101.1 filed on Apr. 16, 2021, the disclosures of which are incorporated by reference herein in their entireties.

TECHNICAL FIELD

The present disclosure relates to the field of communications technology, in particular to a method and an apparatus for PUCCH transmission, a terminal and a network-side device.

BACKGROUND

In the 5$^{th}$ generation new RAT (5 Generation New RAT, 5G NR) system, there are a large quantity of ultra-reliable and low latency communication (Ultra-Reliable and Low Latency Communication, URLLC) services. The URLLC service requires a quite low latency. Considering that uplink transmission and downlink transmission on unpaired spectrum share the same spectrum resource, both uplink and downlink need to be transmitted in Time Division Multiplexing (TDM) manner. Therefore, in a carrier group, a carrier configured for transmission of physical uplink control channel (Physical Uplink Control Channel, PUCCH) may be limited by an uplink/downlink slot ratio, and it is not possible to find an available uplink resource at a time-domain position closest to a processing time that meets the downlink transmission. In order to avoid the transmission delay and the impact on URLLC performance, PUCCH carrier switching is proposed. However, there is currently no specific method on how to perform PUCCH transmission in a PUCCH carrier switching manner.

SUMMARY

An embodiment of the present disclosure provides a method for PUCCH transmission, which includes:

- determining, by a terminal, a first time unit for a physical uplink control channel PUCCH transmission on a first carrier;
- determining, by the terminal, a second time unit for the PUCCH transmission on a second carrier based on the first time unit; and
- transmitting, by the terminal, a PUCCH in the second time unit on the second carrier,
- where the first carrier is a carrier where the PUCCH is transmitted before PUCCH carrier switching is performed by the terminal, the second carrier is a carrier where the PUCCH is transmitted after the PUCCH carrier switching is performed by the terminal, and the terminal determines to perform the PUCCH carrier switching in the first time unit of the first carrier.

Optionally, the determining the second time unit for the PUCCH transmission on the second carrier based on the first time unit includes one of the following:

- determining a time unit on the second carrier that overlaps with the first time unit as the second time unit;

- determining a target time unit of time units on the second carrier that overlap with the first time unit as the second time unit;
- determining the second time unit based on indication information of a first indication field of downlink control information (Downlink Control Information, DCI) corresponding to a PUCCH that requires carrier switching;
- determining the second time unit based on pre-configured information of the first time unit.

Optionally, the target time unit includes one of the following:

- a first one of the time units that overlap with the first time unit;
- a last one of the time units that overlap with the first time unit;
- a first one of time units that overlap with the first time unit and include available PUCCH resources;
- a last one of time units that overlap with the first time unit and include available PUCCH resources;
- a time unit that overlaps with the first time unit and overlaps with a starting symbol of the PUCCH on the first carrier;
- a time unit that overlaps with the first time unit and overlaps with a starting time of the PUCCH on the first carrier;
- a time unit that overlaps with the first time unit and overlaps with an ending symbol of the PUCCH on the first carrier;
- a time unit that overlaps with the first time unit and overlaps with an ending time of the PUCCH on the first carrier;
- a first one of time units that overlap with the first time unit and overlap with at least one symbol in a symbol set occupied by the PUCCH on the first carrier;
- a last one of time units that overlap with the first time unit and overlap with at least one symbol in a symbol set occupied by the PUCCH on the first carrier.

Optionally, the indication information of the first indication field includes one of the following: information of the second time unit; a time-domain offset relative to a time-domain position of the PUCCH on the first carrier; a time-domain offset relative to the first time unit of the first carrier.

Optionally, the pre-configured information of the first time unit includes one of the following: information of the second time unit; a time-domain offset relative to a time-domain position of the PUCCH on the first carrier; a time-domain offset relative to the first time unit of the first carrier.

Optionally, the available PUCCH resource is a PUCCH resource that meets a first condition; the first condition includes at least one of the following:

- not overlapping with downlink symbols of the second carrier;
- not overlapping with symbols occupied by a synchronization signal and physical broadcast channel PBCH block (Synchronization Signal and PBCH block, SSB) on the second carrier;
- not overlapping, in a time domain, with an uplink transmission on the second carrier that is configured by higher-layer signaling;
- not overlapping, in a frequency domain, with the uplink transmission on the second carrier that is configured by the higher-layer signaling; or
- meeting a requirement of a preparation time for information carried by the PUCCH.

Optionally, a subcarrier spacing (Sub-carrier Spacing, SCS) of the second carrier is larger than or equal to a SCS of the first carrier.

Optionally, a unit of the first time unit is the same as a unit of the second time unit; or the quantity of symbols contained in the first time unit is less than or equal to the quantity of symbols contained in the second time unit.

An embodiment of the present disclosure provides a method for PUCCH transmission, which includes:

determining, by a network-side device, a first time unit for a physical uplink control channel PUCCH transmission on a first carrier;

determining, by the network-side device, a second time unit for the PUCCH transmission on a second carrier based on the first time unit; and receiving, by the network-side device, a PUCCH from a terminal in the second time unit on the second carrier, where the first carrier is a carrier where the PUCCH is transmitted before PUCCH carrier switching is performed by the terminal, the second carrier is a carrier where the PUCCH is transmitted after the PUCCH carrier switching is performed by the terminal, and the terminal determines to perform the PUCCH carrier switching in the first time unit of the first carrier.

Optionally, the determining the second time unit for the PUCCH transmission on the second carrier based on the first time unit includes one of the following:

determining a time unit on the second carrier that overlaps with the first time unit as the second time unit;

determining a target time unit of time units on the second carrier that overlap with the first time unit as the second time unit;

determining the second time unit based on indication information of a first indication field of downlink control information DCI corresponding to a PUCCH that requires carrier switching;

determining the second time unit based on pre-configured information of the first time unit.

Optionally, the target time unit includes one of the following:

a first one of the time units that overlap with the first time unit;

a last one of the time units that overlap with the first time unit;

a first one of time units that overlap with the first time unit and include available PUCCH resources;

a last one of time units that overlap with the first time unit and include available PUCCH resources;

a time unit that overlaps with the first time unit and overlaps with a starting symbol of the PUCCH on the first carrier;

a time unit that overlaps with the first time unit and overlaps with a starting time of the PUCCH on the first carrier;

a time unit that overlaps with the first time unit and overlaps with an ending symbol of the PUCCH on the first carrier;

a time unit that overlaps with the first time unit and overlaps with an ending time of the PUCCH on the first carrier;

a first one of time units that overlap with the first time unit and overlap with at least one symbol in a symbol set occupied by the PUCCH on the first carrier;

a last one of time units that overlap with the first time unit and overlap with at least one symbol in a symbol set occupied by the PUCCH on the first carrier.

Optionally, the indication information of the first indication field includes one of the following:

information of the second time unit;

a time-domain offset relative to a time-domain position of the PUCCH on the first carrier;

a time-domain offset relative to the first time unit of the first carrier.

Optionally, the pre-configured information of the first time unit includes one of the following:

information of the second time unit;

a time-domain offset relative to a time-domain position of the PUCCH on the first carrier;

a time-domain offset relative to the first time unit of the first carrier.

Optionally, the available PUCCH resource is a PUCCH resource that meets a first condition;

the first condition includes at least one of the following:

not overlapping with downlink symbols of the second carrier;

not overlapping with symbols occupied by a synchronization signal and physical broadcast channel PBCH block SSB on the second carrier;

not overlapping, in a time domain, with an uplink transmission on the second carrier that is configured by higher-layer signaling;

not overlapping, in a frequency domain, with the uplink transmission on the second carrier that is configured by the higher-layer signaling; or meeting a requirement of a preparation time for information carried by the PUCCH.

Optionally, a subcarrier spacing SCS of the second carrier is larger than or equal to a SCS of the first carrier.

Optionally, a unit of the first time unit is the same as a unit of the second time unit; or the quantity of symbols contained in the first time unit is less than or equal to the quantity of symbols contained in the second time unit.

An embodiment of the present disclosure provides a terminal, which includes a memory, a transceiver and a processor. The memory is configured to store a computer program; the transceiver is configured to transmit and receive data under control of the processor; and the processor is configured to read the computer program in the memory to perform following operations:

determining a first time unit for a physical uplink control channel PUCCH transmission on a first carrier; and determining a second time unit for the PUCCH transmission on a second carrier based on the first time unit.

The transceiver is configured to transmit a PUCCH in the second time unit on the second carrier. The first carrier is a carrier where the PUCCH is transmitted before PUCCH carrier switching is performed by the terminal, the second carrier is a carrier where the PUCCH is transmitted after the PUCCH carrier switching is performed by the terminal, and the terminal determines to perform the PUCCH carrier switching in the first time unit of the first carrier.

Optionally, the determining the second time unit for the PUCCH transmission on the second carrier based on the first time unit includes one of the following:

determining a time unit on the second carrier that overlaps with the first time unit as the second time unit;

determining a target time unit of time units on the second carrier that overlap with the first time unit as the second time unit;

determining the second time unit based on indication information of a first indication field of downlink control information DCI corresponding to a PUCCH that requires carrier switching;

determining the second time unit based on pre-configured information of the first time unit.

Optionally, the target time unit includes one of the following:

a first one of the time units that overlap with the first time unit;

a last one of the time units that overlap with the first time unit;

a first one of time units that overlap with the first time unit and include available PUCCH resources;

a last one of time units that overlap with the first time unit and include available PUCCH resources;

a time unit that overlaps with the first time unit and overlaps with a starting symbol of the PUCCH on the first carrier;

a time unit that overlaps with the first time unit and overlaps with a starting time of the PUCCH on the first carrier;

a time unit that overlaps with the first time unit and overlaps with an ending symbol of the PUCCH on the first carrier;

a time unit that overlaps with the first time unit and overlaps with an ending time of the PUCCH on the first carrier;

a first one of time units that overlap with the first time unit and overlap with at least one symbol in a symbol set occupied by the PUCCH on the first carrier;

a last one of time units that overlap with the first time unit and overlap with at least one symbol in a symbol set occupied by the PUCCH on the first carrier.

Optionally, the indication information of the first indication field includes one of the following: information of the second time unit; a time-domain offset relative to a time-domain position of the PUCCH on the first carrier; a time-domain offset relative to the first time unit of the first carrier.

Optionally, the pre-configured information of the first time unit includes one of the following: information of the second time unit; a time-domain offset relative to a time-domain position of the PUCCH on the first carrier; a time-domain offset relative to the first time unit of the first carrier.

Optionally, the available PUCCH resource is a PUCCH resource that meets a first condition; the first condition includes at least one of the following:

not overlapping with downlink symbols of the second carrier;

not overlapping with symbols occupied by a synchronization signal and physical broadcast channel PBCH block SSB on the second carrier;

not overlapping, in a time domain, with an uplink transmission on the second carrier that is configured by higher-layer signaling;

not overlapping, in a frequency domain, with the uplink transmission on the second carrier that is configured by the higher-layer signaling; or meeting a requirement of a preparation time for information carried by the PUCCH.

Optionally, a subcarrier spacing SCS of the second carrier is larger than or equal to a SCS of the first carrier.

Optionally, a unit of the first time unit is the same as a unit of the second time unit; or the quantity of symbols contained in the first time unit is less than or equal to the quantity of symbols contained in the second time unit.

An embodiment of the present disclosure provides a network-side device, which includes a memory, a transceiver and a processor. The memory is configured to store a computer program; the transceiver is configured to transmit and receive data under control of the processor; and the processor is configured to read the computer program in the memory to perform following operations:

determining a first time unit for a physical uplink control channel PUCCH transmission on a first carrier; and determining a second time unit for the PUCCH transmission on a second carrier based on the first time unit.

The transceiver is configured to receive a PUCCH from a terminal in the second time unit on the second carrier. The first carrier is a carrier where the PUCCH is transmitted before PUCCH carrier switching is performed by the terminal, the second carrier is a carrier where the PUCCH is transmitted after the PUCCH carrier switching is performed by the terminal, and the terminal determines to perform the PUCCH carrier switching in the first time unit of the first carrier.

Optionally, the determining the second time unit for the PUCCH transmission on the second carrier based on the first time unit includes one of the following:

determining a time unit on the second carrier that overlaps with the first time unit as the second time unit;

determining a target time unit of time units on the second carrier that overlap with the first time unit as the second time unit;

determining the second time unit based on indication information of a first indication field of downlink control information DCI corresponding to a PUCCH that requires carrier switching;

determining the second time unit based on pre-configured information of the first time unit.

Optionally, the target time unit includes one of the following:

a first one of the time units that overlap with the first time unit;

a last one of the time units that overlap with the first time unit;

a first one of time units that overlap with the first time unit and include available PUCCH resources;

a last one of time units that overlap with the first time unit and include available PUCCH resources;

a time unit that overlaps with the first time unit and overlaps with a starting symbol of the PUCCH on the first carrier;

a time unit that overlaps with the first time unit and overlaps with a starting time of the PUCCH on the first carrier;

a time unit that overlaps with the first time unit and overlaps with an ending symbol of the PUCCH on the first carrier;

a time unit that overlaps with the first time unit and overlaps with an ending time of the PUCCH on the first carrier;

a first one of time units that overlap with the first time unit and overlap with at least one symbol in a symbol set occupied by the PUCCH on the first carrier;

a last one of time units that overlap with the first time unit and overlap with at least one symbol in a symbol set occupied by the PUCCH on the first carrier.

Optionally, the indication information of the first indication field includes one of the following:

information of the second time unit;

a time-domain offset relative to a time-domain position of the PUCCH on the first carrier;

a time-domain offset relative to the first time unit of the first carrier.

Optionally, the pre-configured information of the first time unit includes one of the following: information of the second time unit; a time-domain offset relative to a time-domain position of the PUCCH on the first carrier; a time-domain offset relative to the first time unit of the first carrier.

Optionally, the available PUCCH resource is a PUCCH resource that meets a first condition; the first condition includes at least one of the following:

not overlapping with downlink symbols of the second carrier;

not overlapping with symbols occupied by a synchronization signal and physical broadcast channel PBCH block SSB on the second carrier;

not overlapping, in a time domain, with an uplink transmission on the second carrier that is configured by higher-layer signaling;

not overlapping, in a frequency domain, with the uplink transmission on the second carrier that is configured by the higher-layer signaling; or meeting a requirement of a preparation time for information carried by the PUCCH.

Optionally, a subcarrier spacing SCS of the second carrier is larger than or equal to a SCS of the first carrier.

Optionally, a unit of the first time unit is the same as a unit of the second time unit; or the quantity of symbols contained in the first time unit is less than or equal to the quantity of symbols contained in the second time unit.

An embodiment of the present disclosure provides an apparatus for PUCCH transmission, which includes:

a first determination unit, configured to determine a first time unit for a physical uplink control channel PUCCH transmission on a first carrier;

a second determination unit, configured to determine a second time unit for the PUCCH transmission on a second carrier based on the first time unit; and a transmission unit, configured to transmit a PUCCH in the second time unit on the second carrier, where the first carrier is a carrier where the PUCCH is transmitted before PUCCH carrier switching is performed by a terminal, the second carrier is a carrier where the PUCCH is transmitted after the PUCCH carrier switching is performed by the terminal, and the terminal determines to perform the PUCCH carrier switching in the first time unit of the first carrier.

The second determination unit specifically includes one of the following:

a first determination subunit, configured to determine a time unit on the second carrier that overlaps with the first time unit as the second time unit;

a second determination subunit, configured to determine a target time unit of time units on the second carrier that overlap with the first time unit as the second time unit;

a third determination subunit, configured to determine the second time unit based on indication information of a first indication field of downlink control information DCI corresponding to a PUCCH that requires carrier switching;

a fourth determination subunit, configured to determine the second time unit based on pre-configured information of the first time unit.

Optionally, the target time unit includes one of the following:

a first one of the time units that overlap with the first time unit;

a last one of the time units that overlap with the first time unit;

a first one of time units that overlap with the first time unit and include available PUCCH resources;

a last one of time units that overlap with the first time unit and include available PUCCH resources;

a time unit that overlaps with the first time unit and overlaps with a starting symbol of the PUCCH on the first carrier;

a time unit that overlaps with the first time unit and overlaps with a starting time of the PUCCH on the first carrier;

a time unit that overlaps with the first time unit and overlaps with an ending symbol of the PUCCH on the first carrier;

a time unit that overlaps with the first time unit and overlaps with an ending time of the PUCCH on the first carrier;

a first one of time units that overlap with the first time unit and overlap with at least one symbol in a symbol set occupied by the PUCCH on the first carrier;

a last one of time units that overlap with the first time unit and overlap with at least one symbol in a symbol set occupied by the PUCCH on the first carrier.

Optionally, the indication information of the first indication field includes one of the following: information of the second time unit; a time-domain offset relative to a time-domain position of the PUCCH on the first carrier; a time-domain offset relative to the first time unit of the first carrier.

Optionally, the pre-configured information of the first time unit includes one of the following: information of the second time unit; a time-domain offset relative to a time-domain position of the PUCCH on the first carrier; a time-domain offset relative to the first time unit of the first carrier.

Optionally, the available PUCCH resource is a PUCCH resource that meets a first condition; the first condition includes at least one of the following:

not overlapping with downlink symbols of the second carrier;

not overlapping with symbols occupied by a synchronization signal and physical broadcast channel PBCH block SSB on the second carrier;

not overlapping, in a time domain, with an uplink transmission on the second carrier that is configured by higher-layer signaling;

not overlapping, in a frequency domain, with the uplink transmission on the second carrier that is configured by the higher-layer signaling; or meeting a requirement of a preparation time for information carried by the PUCCH.

Optionally, a subcarrier spacing SCS of the second carrier is larger than or equal to a SCS of the first carrier.

Optionally, a unit of the first time unit is the same as a unit of the second time unit; or the quantity of symbols contained in the first time unit is less than or equal to the quantity of symbols contained in the second time unit.

An embodiment of the present disclosure provides an apparatus for PUCCH transmission, which includes:

a third determination unit, configured to determine a first time unit for a physical uplink control channel PUCCH transmission on a first carrier;

a fourth determination unit, configured to determine a second time unit for the PUCCH transmission on a second carrier based on the first time unit; and a receiving unit, configured to receive a PUCCH from a terminal in the second time unit on the second carrier, where the first carrier is a carrier where the PUCCH is transmitted before PUCCH carrier switching is performed by the terminal, the second carrier is a carrier where the PUCCH is transmitted after the PUCCH carrier switching is performed by the terminal, and the terminal determines to perform the PUCCH carrier switching in the first time unit of the first carrier.

Optionally, the fourth determination unit specifically includes one of the following:

a fifth determination subunit, configured to determine a time unit on the second carrier that overlaps with the first time unit as the second time unit;

a sixth determination subunit, configured to determine a target time unit of time units on the second carrier that overlap with the first time unit as the second time unit;

a seventh determination subunit, configured to determine the second time unit based on indication information of a first indication field of downlink control information DCI corresponding to a PUCCH that requires carrier switching;

an eighth determination subunit, configured to determine the second time unit based on pre-configured information of the first time unit.

Optionally, the target time unit includes one of the following:

a first one of the time units that overlap with the first time unit;

a last one of the time units that overlap with the first time unit;

a first one of time units that overlap with the first time unit and include available PUCCH resources;

a last one of time units that overlap with the first time unit and include available PUCCH resources;

a time unit that overlaps with the first time unit and overlaps with a starting symbol of the PUCCH on the first carrier;

a time unit that overlaps with the first time unit and overlaps with a starting time of the PUCCH on the first carrier;

a time unit that overlaps with the first time unit and overlaps with an ending symbol of the PUCCH on the first carrier;

a time unit that overlaps with the first time unit and overlaps with an ending time of the PUCCH on the first carrier;

a first one of time units that overlap with the first time unit and overlap with at least one symbol in a symbol set occupied by the PUCCH on the first carrier;

a last one of time units that overlap with the first time unit and overlap with at least one symbol in a symbol set occupied by the PUCCH on the first carrier.

Optionally, the indication information of the first indication field includes one of the following: information of the second time unit, a time-domain offset relative to a time-domain position of the PUCCH on the first carrier, a time-domain offset relative to the first time unit of the first carrier.

Optionally, the pre-configured information of the first time unit includes one of the following: information of the second time unit, a time-domain offset relative to a time-domain position of the PUCCH on the first carrier, a time-domain offset relative to the first time unit of the first carrier.

Optionally, the available PUCCH resource is a PUCCH resource that meets a first condition; the first condition includes at least one of the following:

not overlapping with downlink symbols of the second carrier;

not overlapping with symbols occupied by a synchronization signal and physical broadcast channel PBCH block SSB on the second carrier;

not overlapping, in a time domain, with an uplink transmission on the second carrier that is configured by higher-layer signaling;

not overlapping, in a frequency domain, with the uplink transmission on the second carrier that is configured by the higher-layer signaling; or meeting a requirement of a preparation time for information carried by the PUCCH.

Optionally, a subcarrier spacing SCS of the second carrier is larger than or equal to a SCS of the first carrier.

Optionally, a unit of the first time unit is the same as a unit of the second time unit, or, the quantity of symbols contained in the first time unit is less than or equal to the quantity of symbols contained in the second time unit.

An embodiment of the present disclosure provides a processor readable storage medium, where the processor readable storage medium stores a computer program, and the computer program is configured to enable a processor to perform steps in the method as described above.

BRIEF DESCRIPTION OF THE DRAWINGS

In order to provide a clearer illustration of the technical solution of embodiments of the present disclosure, the drawings required in the description of the embodiments of the present disclosure will be illustrated hereinafter briefly. Apparently, the accompanying drawings in the following description merely relate to some embodiments of the present disclosure, and based on these drawings, a person of ordinary skill in the art may obtain other drawings without creative effort.

DETAILED DESCRIPTION

Figures 1, 2:
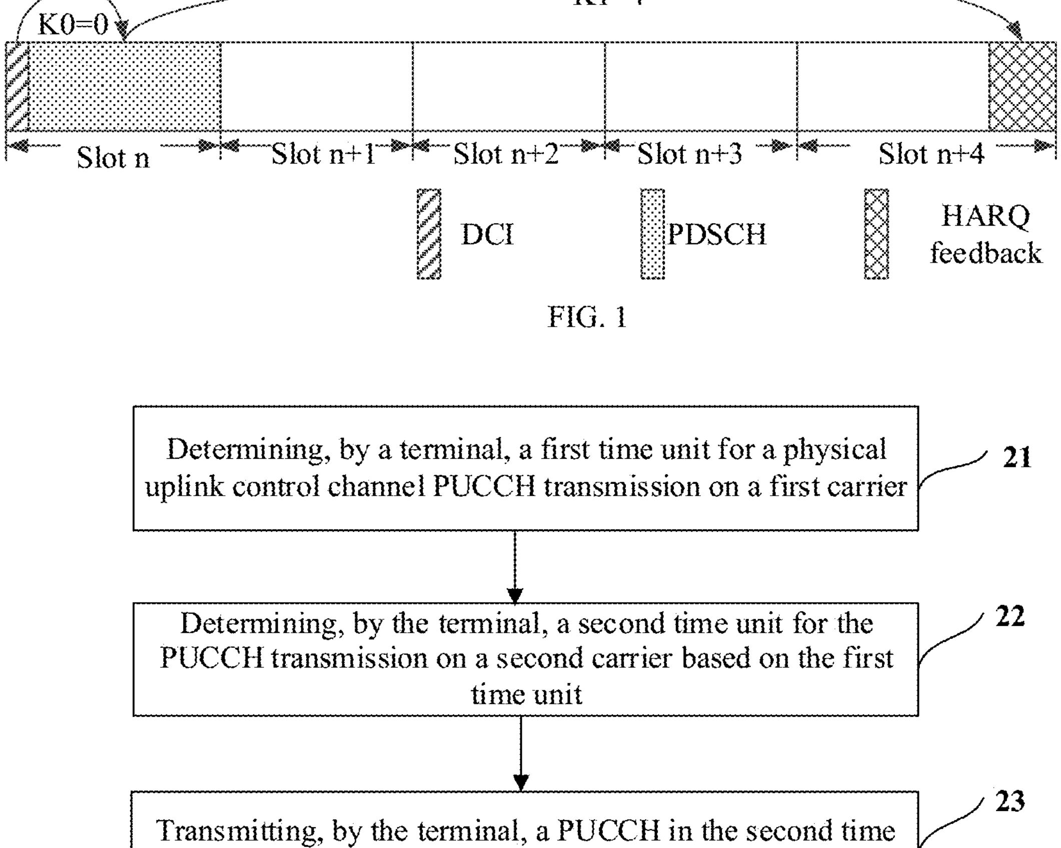
FIG. 1 is a schematic diagram showing downlink scheduling timing and HARQ-ACK feedback timing.
FIG. 2 is a first flow chart of a method for PUCCH transmission according to an embodiment of the present disclosure.

In order to make a to-be-solved technical problem, a technical solution, and advantages of the present disclosure clearer, a detailed description will be given below in conjunction with the accompanying drawings and specific embodiments. In the following description, specific details such as specific configurations and components are provided merely to assist in a comprehensive understanding of the embodiments of the present disclosure. Therefore, those skilled in the art should be appreciated that various changes and modifications can be made to the embodiments described herein without departing from the scope and spirit of the present disclosure. In addition, for clarity and conciseness, descriptions of known functions and constructions have been omitted.

It should be appreciated that "an embodiment" or "one embodiment" mentioned throughout the specification means that specific features, structures, or characteristics related to the embodiment are included in at least one embodiment of the present disclosure. Therefore, words "in an embodiment" or "in one embodiment" appearing throughout the entire specification may not necessarily refer to the same embodiment. In addition, these specific features, structures, or characteristics may be combined in one or more embodiments in any suitable manner.

In various embodiments of the present disclosure, it should be appreciated that the size of a sequence number of each of the following processes does not imply the order of execution, and the execution order of each process should be determined based on the function and internal logic of the each process, which should not constitute any limitations on the implementation process of the present disclosure.

The term "and/or" in the embodiments of the present disclosure describes an association relationship of associated objects, indicating that there may be three types of relationships. For example, A and/or B, which can represent three situations of A alone, both A and B, and B alone. The character "/" generally indicates that the associated objects before and after the character is in an "or" relationship.

The term "multiple" in the embodiments of the present disclosure refers to two or more, the similar applies to other quantifiers.

The technical solution of embodiments of the present disclosure will be clearly and completely described hereinafter in conjunction with the accompanying drawings. Apparently, the described embodiments merely relate to a part of, rather than all of, the embodiments of the present disclosure, and based on these embodiments, a person of ordinary skill in the art may, without any creative effort, obtain other embodiments, which also fall within the scope of the present disclosure.

In the description of the embodiments of the present disclosure, some of the concepts used in the following description are explained firstly.

Uplink control information (Uplink Control Information, UCI) includes: hybrid automatic repeat request-acknowledgment (Hybrid Automatic Repeat request-ACKnowledgment, HARQ-ACK), channel state information (Channel State Information, CSI), scheduling request (Scheduling Request, SR), and other information. HARQ-ACK is a collective term for acknowledgment (ACKnowledgment, ACK) and non-acknowledgment (Non-ACKnowledgment, NACK), used to provide feedback for physical downlink shared channel (Physical Downlink Shared Channel, PDSCH) or physical downlink control channel (Physical Downlink Control Channel, PDCCH) for indicating semi-persistent scheduling (Semi-Persistent Scheduling, SPS) resource release (also known as SPS PDSCH release), so as to inform a base station whether the PDSCH or the PDCCH for indicating SPS PDSCH release is correctly received. CSI is used to provide feedback on quality of a downlink channel, thereby to help the base station perform downlink scheduling in a better manner, for example, selecting a modulation and coding scheme (Modulation and Coding Scheme, MCS), or configuring an appropriate resource block (Resource Block, RB) resource based on the CSI. SR is used to request a transmission resource of physical downlink shared channel (Physical Downlink Shared Channel, PDSCH) carrying an uplink service from a base station, when the terminal needs to transmit the uplink service. UCI is transmitted on PUCCH. PUCCH is always transmitted on a fixed carrier.

For a carrier aggregation (Carrier aggregation, CA) scenario:

PUCCH is transmitted on a primary component carrier (Primary Component Carrier, PCC) or a primary cell (Primary Cell, PCell). In a CA scenario where PUCCH is configured to be transmitted on a secondary component carrier (Secondary Component Carrier, SCC) or secondary cell (Secondary Cell, SCell), the aggregated carriers may be divided into two PUCCH carrier groups, and a carrier is specified in each of the PUCCH carrier groups to transmit the PUCCH. The carrier group including PCC (or PCell) is a primary PUCCH carrier group, and PUCCH is transmitted on PCC (or PCell). In a secondary PUCCH carrier group, SCCs (or SCells) are included, and one of the SCCs (or SCells) is configured to be capable of transmitting the PUCCH through higher-layer signaling, which is referred to as PUCCH SCell. HARQ-ACKs of downlink transmissions (including PDSCH, and PDCCH requiring HARQ-ACK feedback) on all carriers in each carrier group are transmitted in PUCCH on the specified carrier.

For a dual-connective (Dual-connective, DC) scenario:

for two carrier groups including master carrier group (Master Carrier Group, MCG) and secondary carrier group (Secondary Carrier Group, SCG), PUCCH is transmitted on a specified carrier in each of the carrier groups. The MCG contains PCC, and PUCCH is transmitted on PCC; the SCC contains SCGs, and PUCCH is transmitted on a pre-configured SCC (also referred to as PSCell).

Flexible timing relationship is supported in 5G NR. Downlink transmissions with dynamic scheduling (i.e., transmissions scheduled by PDCCH or DCI) include PDSCH scheduled by PDCCH, type 3 HARQ-ACK codebook transmission triggered by DCI, PDCCH itself that needs to perform HARQ-ACK, etc., for example, PDCCH for indicating downlink SPS resource release, or PDCCH for indicating SCell dormancy (dormancy). A slot or subslot where HARQ-ACK transmission is located may be determined based on a feedback timing indication field in a corresponding PDCCH or DCI (PDCCH and DCI may be considered equivalent, DCI is a specific transmission format of PDCCH, and PDCCH is a transmission channel of DCI).

Taking PDSCH as an example, a PDCCH that carries scheduling information of the PDSCH indicates a scheduling timing relationship (Scheduling timing, namely K0) between the PDSCH and the PDCCH, and a feedback timing relationship (HARQ-ACK timing, namely K1) between the PDSCH and a HARQ-ACK corresponding to the PDSCH. Specifically, a time-domain resource allocation indication field in a DCI format used by the PDCCH indicates a slot offset KG between a slot where the PDSCH is located and a slot where the DCI is located. A feedback timing indication field about PDSCH to HARQ-ACK and in the DCI format indicates the quantity of slots K1 between the end of the PDSCH and the beginning of the HARQ-ACK, that is, under the assumption that SCSs of the uplink and downlink are the same, for a PDSCH transmitted in slot n, a HARQ-ACK is transmitted in slot n+K1, as shown in FIG. 1.

A complete set of K1 is {0, 1, 2, 3, 4, 5, 6, 7, 8, 9, 10, 11, 12, 13, 14, 15}, which is configured for a terminal usually with a maximum 8 values. It is defined in the protocol that the value of K1 is in unit of slot (slot), where K1=1 represents an interval of 1 slot. Optionally, the value of K1 may be in unit of slot or subslot, where the subslot may be pre-configured as 2 symbols in length (in a case that 7 subslots exist in sequence in a slot), or 7 symbols in length (in a case that 2 subslots exist in sequence in a slot), etc. Whether there exists a feedback timing indication field in a DCI may be determined based on whether the quantity of indication bits configured by higher-layer signaling is greater than 0, or based on the quantity of elements in a set of feedback timing candidate values K1 configured by higher-layer signaling. When the quantity of elements is greater than 1, the quantity of bits as indicated is determined based on the quantity of elements (for example, ceil(log 2N), where N is the quantity of elements and ceil represents rounding up to an integer). When there is only one element, there is no indication field in the DCI, and this value is directly used to determine the feedback timing.

For semi-static UCI, such as CSI, SR, and HARQ-ACK corresponding to SPS PDSCH (SPS HARQ-ACK for short), a slot or subslot where a PUCCH transmission carrying the semi-static UCI is located is semi-statically determined, which is referred to as semi-static feedback timing. For example, for CSI and SR, a slot and a symbol position in the slot where each transmission occasion is located are determined based on a cycle and an offset value configured by higher-layer signaling, so as to perform periodical transmission at the corresponding slot and the corresponding symbol position by using a PUCCH resource configured by the higher-layer signaling. For SPS HARQ-ACK, a HARQ-ACK feedback position (i.e., a slot or a subslot where it is located) is determined based on a K1 value indicated by a feedback timing indication field in a PDCCH for indicating activation of SPS PDSCH. In a case that there is no feedback timing indication field in the PDCCH for indicating activation of SPS PDSCH, the HARQ-ACK feedback position may be determined based on a K1 value configured by higher-layer signaling.

A PUCCH resource carrying CSI or SR is a PUCCH resource configured by higher-layer signaling for each CSI report (report) or SR configuration. In the system, one or more PUCCH resource sets may be configured for carrying HARQ-ACK of a downlink transmission with dynamic scheduling. In a case that only one PUCCH resource set is configured, a PUCCH resource carrying HARQ-ACK of a downlink transmission with dynamic scheduling may be a resource selected from multiple resources in this resource set based on a PUCCH resource indication field in the scheduled PDCCH. If a resource set contains more than 8 resources, a resource may be selected from multiple resources by using both control channel element (Control Channel Element, CCE) information of a PDCCH and the PUCCH resource indication field in the PDCCH. In a case that multiple PUCCH resource sets are configured, and the quantity of bits of a UCI transmission corresponding to each PUCCH resource set is different from the quantity of bits of a UCI transmission corresponding to each other PUCCH resource set, one PUCCH resource set is selected from the PUCCH resource sets based on the quantity of bits of a UCI carried by a PUCCH, and a resource may be selected from multiple resources in the selected resource set based on a PUCCH resource indication field in the scheduled PDCCH. In a case that there is only one PUCCH resource in a resource set, a PUCCH resource indication field may not exist in a PDCCH, and this resource may be directly used for transmission.

Flexible uplink/downlink slot ratio is also supported by NR. In one aspect, it may be semi-statically configured by higher-layer signaling that for multiple slots included in a period of time, which slots are downlink slots, which slots are uplink slots, and which slots are mixed slots including both uplink and downlink. For example, higher-layer signaling may configure a starting point of full downlink slots, the quantity of consecutive full downlink slots, and the quantity of downlink symbols in one slot after the full downlink slots, the quantity of uplink symbols in a slot before a first full uplink slot, the quantity of, or an end position of consecutive full uplink slots. All symbol positions where uplink symbols or downlink symbols are not indicated are considered as flexible symbols, and the flexible symbol may be dynamically used for downlink transmission or uplink transmission. In another aspect, change of the uplink/downlink slot ratio may also be indicated dynamically, such as periodically transmitting DCI for indicating slot format indication (Slot Format Indication, SFI) to notify the division of uplink and downlink symbols in each slot of one or more consecutive slots, thereby to adjust the quantity of uplink and downlink symbols within each slot.

Two indicators of URLLC include: ultra-reliable transmission, such as achieving the block error rate (Block Error Rate, BLER) performance of 10-5 or even lower, and low latency, such as air-interface one-way transmission time not exceeding 0.5 ms or 1 ms. The UCI transmission latency of URLLC may affect the transmission latency of a URLLC service. For example, the latency of HARQ-ACK feedback may adversely affect retransmission of PDSCH, and the latency of CSI feedback may adversely affect the scheduling of PDSCH, thereby adversely affecting the latency of a downlink service. The latency of SR may adversely affect the latency of PUSCH, thereby adversely affecting the latency of an uplink service. In order to reduce the transmission latency of PUCCH, a transmission method based on PUCCH carrier switching is proposed.

Specifically, the embodiments of the present disclosure provide a method for PUCCH transmission, so as to achieve PUCCH transmission in a PUCCH carrier switching manner.

As shown in FIG. 2, an embodiment of the present disclosure provides a method for PUCCH transmission, applied to a terminal, which specifically includes the following steps.

Step 21, determining, by the terminal, a first time unit for a physical uplink control channel PUCCH transmission on a first carrier.

The first carrier is a carrier where a PUCCH is transmitted before the terminal performs PUCCH carrier switching, and the terminal determines to perform the PUCCH carrier switching in the first time unit of the first carrier. The first carrier is a carrier originally configured to transmit the PUCCH, such as PCell, PUCCH Scell, or PScell. The terminal may determine a time unit position of the PUCCH transmission on the first carrier, namely, determining the first time unit. For example, for HARQ-ACK, a time unit (such as a slot or a subslot) where a PUCCH transmission carrying the HARQ-ACK is located may be determined based on a dynamic or semi-static feedback timing relationship. For CSI or SR, periodic transmission occasions may be determined based on a transmission period and an offset configured for a carrier where the PUCCH is initially transmitted. For example, for CSI, in a case that the configured period is 2 slots and the offset is 0 (i.e., an offset value relative to a first slot in a radio frame), it is determined that slots where a transmission of the CSI is located are slots #0, #2, #4, #6, #8, etc., in each radio frame.

Step 22, determining, by the terminal, a second time unit for the PUCCH transmission on a second carrier based on the first time unit.

The second carrier is a carrier where the PUCCH is transmitted after the terminal performs the PUCCH carrier switching. The second carrier is a carrier that has the capability of transmitting the PUCCH through the PUCCH carrier switching. Specifically, the terminal is configured or allowed to perform PUCCH switching between the first carrier and the second carrier. In an embodiment, the first carrier is switched to the second carrier. That is, the PUCCH is usually transmitted on the first carrier, and when a switching condition is met and carrier switching is required, the first carrier is switched to the second carrier to transmit the PUCCH.

In the embodiments, when PUCCH carrier switching needs to be performed, the terminal determines the second time unit for PUCCH transmission on a second carrier after the PUCCH carrier switching, based on the first time unit for the PUCCH transmission on the first carrier before the PUCCH carrier switching.

Step 23, transmitting, by the terminal, a PUCCH in the second time unit on the second carrier.

After having determined the second time unit for the PUCCH transmission on the second carrier based on the first time unit for the PUCCH transmission on the first carrier, the terminal transmits the PUCCH by using the second time unit on the second carrier, to complete the PUCCH transmission after the PUCCH carrier switching. In this case, the terminal no longer transmits the PUCCH in the first time unit of the first carrier, and the behavior of the PUCCH transmission is performed in the second time unit on the second carrier as switched.

In the embodiments, in the first time unit where PUCCH needs to be transmitted on the first carrier, when it is determined that the PUCCH carrier switching is required, a target carrier after the PUCCH carrier switching may be determined as the second carrier according to a predetermined rule. The second time unit on the second carrier is determined based on the first time unit on the first carrier, and the PUCCH is transmitted in the second time unit on the second carrier. Information carried by the PUCCH transmitted in the second time unit on the second carrier is UCI (or may be only a portion of the information) on the PUCCH that needs to be transmitted in the first time unit of the first carrier before the PUCCH carrier switching is performed. Therefore, after the PUCCH carrier switching, there is no need to perform the PUCCH transmission in the first time unit of the first carrier, thereby to achieve PUCCH transmission from one carrier to another carrier.

It should be noted that when the second time unit on the second carrier is switched for PUCCH transmission, a specific time-domain resource (such as the positions and the quantity of specific symbols occupied in the second time unit) and a frequency-domain resource (such as the quantity and positions of RBs, as well as a code-domain resource (such as orthogonal sequence, cyclic shift, and other parameters) of the PUCCH transmitted in the second time unit on the second carrier may be determined according to another rule, which is not particularly defined herein.

According to the embodiment of the present disclosure, when PUCCH carrier switching needs to be performed, the second time unit for PUCCH transmission on the second carrier after the switching is determined based on the first time unit for the PUCCH transmission on the first carrier before the PUCCH carrier switching. Therefore, a time unit for PUCCH transmission on a carrier after PUCCH carrier switching is determined without the need for notification or instruction by additional signaling, so as to ensure a normal implementation of transmission during PUCCH carrier switching without adding additional signaling overhead.

Furthermore, the determining the second time unit for the PUCCH transmission on the second carrier based on the first time unit may include one of the following manners (1) to (4).

Manner (1) includes: determining a time unit on the second carrier that overlaps with the first time unit as the second time unit.

Manner (2) includes: determining a target time unit of time units on the second carrier that overlap with the first time unit as the second time unit.

The second time unit may be a specific time unit among the time units that overlap with the first time unit on the first carrier. For example, in the case that SCS of the first carrier is smaller, or a PUCCH transmission time unit of the first carrier is larger, there may exist multiple second time units overlapping with one first time unit. In this case, the specific time unit (i.e., the target time unit) from the multiple second time units may be used as the time unit for PUCCH transmission on the second carrier after the PUCCH carrier switching.

Optionally, the target time unit includes an available PUCCH resource.

Specifically, the target time unit may include one of the following items a to j.

(a) The first one of the time units that overlap with the first time unit.

(b) The last one of the time units that overlap with the first time unit.

(c) The first one of time units that overlap with the first time unit and include available PUCCH resources.

The available PUCCH resource is a PUCCH resource that meets a first condition. The first condition may include at least one of the following items c1 to c5.

c1: Not overlapping with downlink symbols of the second carrier. That is, a PUCCH resource that does not overlap with the downlink symbols (configured by higher-layer signaling) on the second carrier is the available PUCCH resource.

c2: Not overlapping with symbols occupied by a synchronization signal and physical broadcast channel PBCH block SSB on the second carrier. That is, a PUCCH resource that does not overlap with the symbols occupied by the SSB on the second carrier is the available PUCCH resource.

c3: Not overlapping, in a time domain, with an uplink transmission on the second carrier that is configured by higher-layer signaling. That is, a PUCCH resource that does not overlap, in the time-domain, with the uplink transmission configured by the higher-layer signaling on the second carrier is the available PUCCH resource. The uplink transmission configured by the higher-layer signaling refers to an uplink transmission without the trigger of PDCCH scheduling, such as semi-static uplink transmission including sounding reference signal (Sounding Reference Signal, SRS), semi-persistent CSI (Semi-Persistent CSI, SP-CSI), configured grant (Configured Grant PUSCH, CG PUSCH), etc.

c4: Not overlapping, in a frequency domain, with the uplink transmission on the second carrier that is configured by the higher-layer signaling. A PUCCH resource that does not overlap, in the frequency domain, with the uplink transmission configured by the higher-layer signaling on the second carrier is the available PUCCH resource.

c5: Meeting a requirement of a preparation time for information carried by the PUCCH.

For example, the meeting the requirement of the preparation time for the information carried by the PUCCH means that when a HARQ-ACK is transmitted on the PUCCH (i.e., the information carried by the PUCCH is the HARQ-ACK), a fixed time interval needs to be met between an ending position of HARQ-ACK downlink transmission (including PDSCH, and PDCCH that requires HARQ-ACK feedback, for example, PDCCH for indicating SPS resource release and PDCCH for indicating SCell dormancy) on the PUCCH and a start position of the PUCCH, where the time interval is a time required for PDSCH processing and for preparation to transmit HARQ-ACK on PUCCH.

For example, it is defined as: $T_{proc,1}=((N_1+d_{1,1}+d_{1,2})(2048+144)\cdot\kappa 2^{-\mu})\cdot T_c$, where $N_1$ is a processing time related to a processing capability of PDSCH that needs to perform HARQ-ACK feedback, a numerical value is selected in a list of processing capabilities according to a reference μ, κ is a ratio of a long term evolution (Long Term Evolution, LTE) sampling time to a NR sampling time, μ is an index of SCS, the reference μ is a minimum value of μ corresponding to PDCCH for scheduling PDSCH, PDSCH itself, or PUCCH itself, $T_C$ is the NR sampling time, and $d_{1,1}$ is an offset value of processing times of HARQ-ACK transmissions on different uplink channels. In a case that a transmission is performed on PUCCH, $d_{1,1}=0$. In a case that a transmission is performed on PDSCH, $d_{1,1}=1$, and $d_{1,2}$ represents an offset of processing time related to the quantity of symbols occupied by the PDSCH.

It should be noted that the specific content of the first condition that the available PUCCH resource needs to meet is set according to requirements. That is, the first condition may include one or more of items c1 to c5. For example, the available PUCCH resource is a PUCCH resource that does not overlap with downlink symbols of the second carrier, and does not overlap with symbols occupied by a synchronization signal and PBCH block SSB on the second carrier. The available PUCCH resource is a PUCCH resource that does not overlap, in a time domain and a frequency domain, with an uplink transmission on the second carrier that is configured by higher-layer signaling, and meets a requirement of a preparation time for information carried by the PUCCH. The specific content of the first condition that the available PUCCH resource needs to meet is set according to requirements. The other multiple combinations will not be repeated.

(d) A last one of time units that overlap with the first time unit and include available PUCCH resources.

(e) A time unit that overlaps with the first time unit and overlaps with a starting symbol of the PUCCH on the first carrier.

(f) A time unit that overlaps with the first time unit and overlaps with a starting time of the PUCCH on the first carrier.

(g) A time unit that overlaps with the first time unit and overlaps with an ending symbol of the PUCCH on the first carrier.

(h) A time unit that overlaps with the first time unit and overlaps with an ending time of the PUCCH on the first carrier.

(i) A first one of time units that overlap with the first time unit and overlap with at least one symbol in a symbol set occupied by the PUCCH on the first carrier.

(j) A last one of time units that overlap with the first time unit and overlap with at least one symbol in a symbol set occupied by the PUCCH on the first carrier.

For (i) and (j), the symbols occupied by the PUCCH on the first carrier may be multiple symbols in the time domain, and different symbols may overlap with different time units, so, there is a situation where multiple time units overlap with the symbols occupied by the PUCCH. In this situation, one of the time units may be selected as the target time unit, for example, selecting the first one or the last one of the time units that overlap with the at least one symbol in the symbol set occupied by the PUCCH on the first carrier.

Manner (3) includes: determining the second time unit based on indication information of a first indication field of downlink control information DCI corresponding to a PUCCH that requires carrier switching.

Specifically, the indication information of the first indication field may include one of the following: information of the second time unit, a time-domain offset relative to a time-domain position of the PUCCH on the first carrier, a time-domain offset relative to the first time unit of the first carrier.

In the embodiment of the present disclosure, for a PUCCH with a corresponding DCI, during PUCCH carrier switching, the second time unit for transmitting the PUCCH on the second carrier may be determined based on the first indication field in the DCI. The first indication field may be a reuse of an existing indication field included in the DCI or a newly added indication field. The first indication field is used to indicate the second time unit on the second carrier (i.e., the indication information of the first indication field directly indicates the information of the second time unit), or to indicate a time-domain offset relative to the time-domain position of the PUCCH on the first carrier, or to indicate a time-domain offset relative to the first time unit on the first carrier. The unit of the time-domain offset may be a symbol or a PUCCH transmission time unit, and the unit of the symbol or the PUCCH transmission time unit is the unit corresponding to the second carrier.

Manner (4) includes: determining the second time unit based on pre-configured information of the first time unit.

Specifically, the pre-configured information of the first time unit includes one of the following: information of the second time unit, a time-domain offset relative to a time-domain position of the PUCCH on the first carrier, a time-domain offset relative to the first time unit of the first carrier.

In the embodiment of the present disclosure, each of the first time units on the first carrier that are capable of performing the PUCCH switching may be predefined or pre-configured with a corresponding second time unit on the second carrier (i.e., predefining or preconfiguring the information of the second time unit), or a time-domain offset value may be predefined or pre-configured. The time-domain offset value is used to indicate a time-domain offset of the PUCCH on the second carrier relative to the time-domain position of the PUCCH on the first carrier, or to indicate a time-domain offset relative to the first time unit. The unit of the time-domain offset may be a symbol or a PUCCH transmission time unit, and the unit of the symbol or the PUCCH transmission time unit is the unit corresponding to the second carrier.

As an optional embodiment, a subcarrier spacing SCS of the second carrier is larger than or equal to a SCS of the first carrier.

In the embodiment of the present disclosure, the SCS of the second carrier is equal to the SCS of the first carrier, or, the SCS of the first carrier is not greater than the SCS of the second carrier. For example, in a case that the SCS of the second carrier is 15 kHz, the SCS of the first carrier is also 15 kHz. For another example, the SCS of the second carrier is 30 kHz, and the SCS of the first carrier may be 15 kHz or 30 kHz, etc.

As an optional embodiment, the unit of the first time unit is the same as the unit of the second time unit. For example, the units of the first time unit and the second time unit are both slots, or both are subslots of the same length.

Alternatively, the unit of the first time unit is different from the unit of the second time unit. For example, the quantity of symbols contained in the first time unit is less than or equal to the quantity of symbols contained in the second time unit. That is, a PUCCH transmission time unit of the first carrier is not larger than a PUCCH transmission time unit of the second carrier. For example, in a case that the PUCCH transmission time unit of the first carrier is a slot, the PUCCH transmission time unit of the second carrier is also a slot. In a case that the PUCCH transmission time unit of the first carrier is a subslot with a length of 7 symbols, the PUCCH transmission time unit of the second carrier may be a slot or a subslot with a length of 7 symbols, but cannot be a subslot with a length of 2 symbols.

The transmission time unit may be in unit of slot or subslot, and subslots may have different lengths, such as a subslot of 2 symbols or a subslot of 7 symbols. In a case that no unit is configured for the PUCCH transmission time unit of the second carrier, it is determined to perform the transmission according to the same unit as the PUCCH transmission time unit of the first carrier or a pre-agreed PUCCH transmission time unit.

Implementation processes of the method for PUCCH transmission in the embodiments of the present disclosure will be described below through specific embodiments.

First Example

Figure 3:
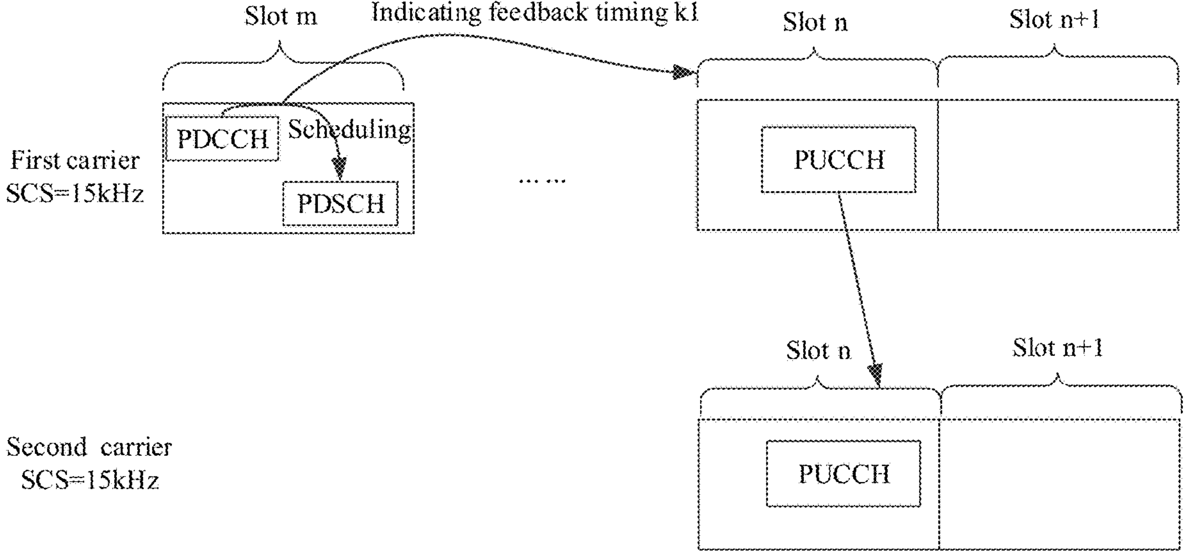
FIG. 3 is a first schematic diagram showing a position of a time unit for transmitting PUCCH during PUCCH carrier switching according to an embodiment of the present disclosure.

As shown in FIG. 3, the first carrier is a carrier (such as PCell, PUCCH Scell, or PScell, etc.) configured for transmitting a PUCCH before PUCCH carrier switching is performed, the second carrier is a carrier that has the capability of transmitting the PUCCH through the carrier switching, and SCSs of the first carrier and the second carrier are the same. On each of the first carrier and the second carrier, PUCCH is transmitted by taking a slot as the transmission time unit, that is, a time-domain resource of each PUCCH does not exceed one slot. In other words, the feedback timing on the first carrier is in unit of slot (i.e., the PUCCH transmission time unit is in unit of slot).

In the first example, based on k1 indicated by a feedback timing indication field in a PDCCH and slot m where a PDSCH transmission scheduled by the PDCCH is located, it may be determined that a HARQ-ACK feedback of a PDSCH is transmitted in slot m+k1, namely slot n (a specific transmission resource in slot n such as a symbol position and an RB resource may be obtained based on the PUCCH resource indication field in the PDCCH, which will not be particularly defined herein). When it is determined that PUCCH transmission needs to be performed in slot n on the first carrier, and it is determined that PUCCH carrier switching needs to be performed in slot n of the first carrier according to a rule of PUCCH carrier switching (how to determine the specific rule is not particularly defined), slot n is determined as the first time unit on the first carrier, and slot n on the second carrier that overlaps with the first time unit may be determined as the second time unit according to manner (1) in the embodiments of the present disclosure, so as to transmit the PUCCH in slot n on the second carrier after the PUCCH carrier switching is performed. Thus, the time unit position of the PUCCH transmission on the target carrier may be determined after the PUCCH carrier switching, without additional signaling for indication.

Second Example

Figure 4:
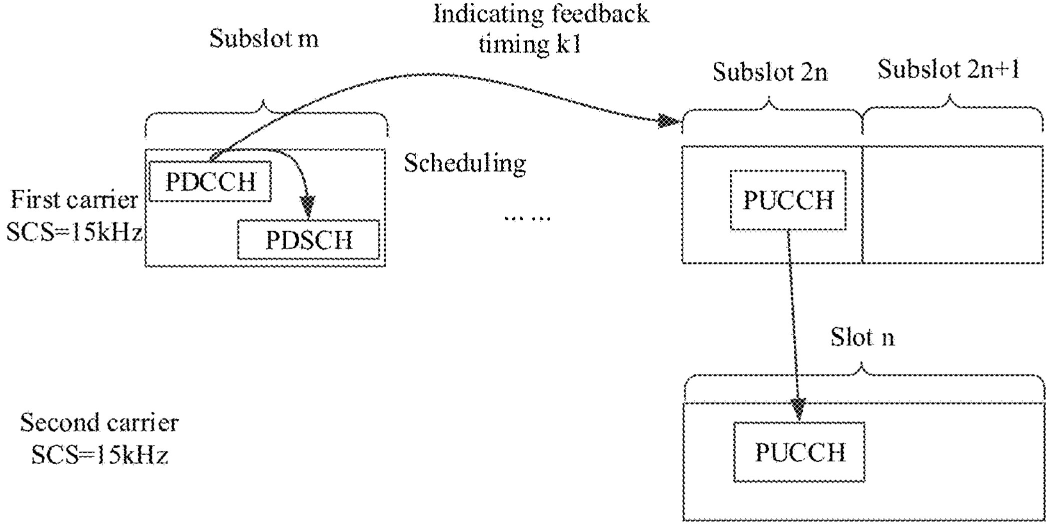
FIG. 4 is a second schematic diagram showing a position of a time unit for transmitting PUCCH during PUCCH carrier switching according to an embodiment of the present disclosure.

As shown in FIG. 4, the first carrier is a carrier configured for transmitting a PUCCH before PUCCH carrier switching is performed, the second carrier is a carrier that has the capability of transmitting the PUCCH through the carrier switching, and SCSs of the first carrier and the second carrier are the same. It is assumed that the PUCCH is transmitted on the first carrier by taking a subslot with a length of 7 symbols as a transmission time unit, i.e., the feedback timing k1 on the first carrier is also in unit of subslot. PUCCH is transmitted on the second carrier by taking slot as the transmission time unit.

In the second example, according to the feedback timing, it is determined that PUCCH transmission is performed in subslot m+k1 of the first carrier, namely in subslot 2n, and it is determined that according to the rule of PUCCH carrier switching, the PUCCH carrier switching needs to be performed in subslot 2n of the first carrier. According to manner (1) in the embodiments of the present disclosure, it may be determined that subslot 2n is the first time unit of the first carrier, slot n is the second time unit on the second carrier that overlaps with the first time unit, and the PUCCH is transmitted in slot n on the second carrier after the PUCCH carrier switching is performed. Thus, the time unit position of the PUCCH transmission on the target carrier may be determined after the PUCCH carrier switching, without additional signaling for indication.

Third Example

Figure 5:
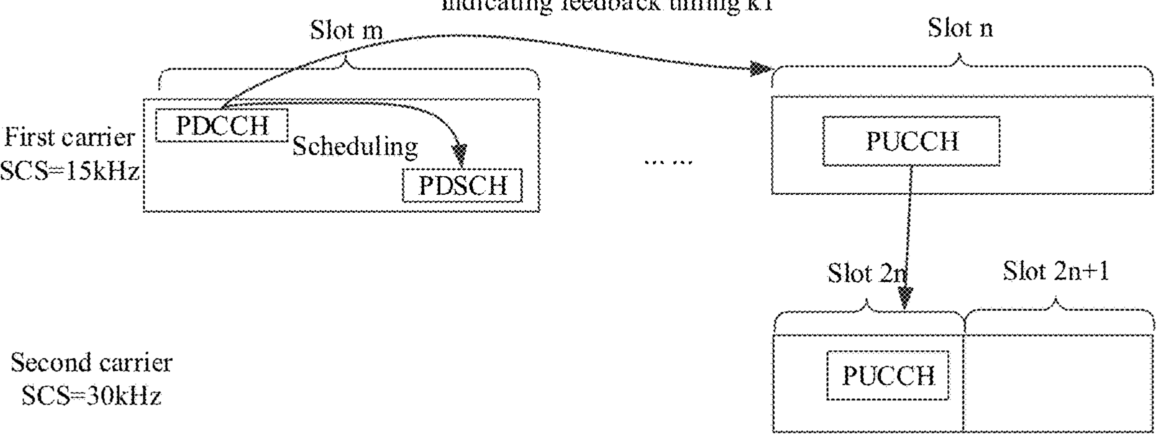
FIG. 5 is a third schematic diagram showing a position of a time unit for transmitting PUCCH during PUCCH carrier switching according to an embodiment of the present disclosure.
Figure 6:
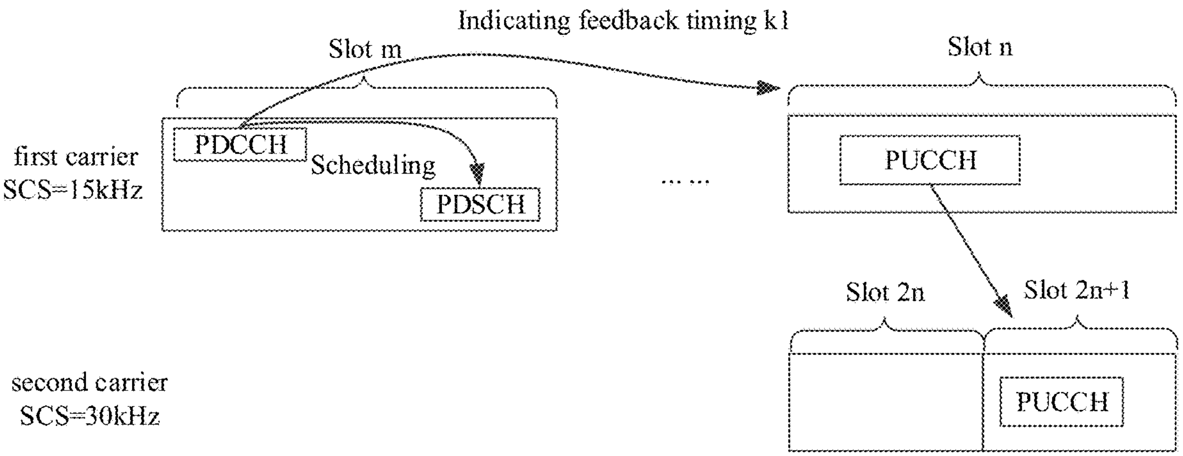
FIG. 6 is a fourth schematic diagram showing a position of a time unit for transmitting PUCCH during PUCCH carrier switching according to an embodiment of the present disclosure.

The first carrier is a carrier configured for transmitting a PUCCH before PUCCH carrier switching is performed, and the second carrier is a carrier that has the capability of transmitting the PUCCH through the carrier switching. The SCS of the first carrier is 15 kHz, and the SCS of the second carrier is 30 kHz. The PUCCH is transmitted on both the first carrier and the second carrier by using slot as the transmission time unit, and when it is determined that PUCCH transmission needs to be performed in slot n on the first carrier, it is determined, according to the rule of PUCCH carrier switching, that PUCCH carrier switching needs to be performed in slot n on the first carrier. According to manner (2) in the embodiments of the present disclosure, it may be determined that slot n is the first time unit on the first carrier, and there exist multiple second time units on the second carrier that overlap with the first time unit, namely slots 2n and 2n+1, and a target time unit among multiple time units that overlap with the first time unit is determined as the second time unit. The target time unit may be determined in multiple manners as follows:

- manner 1: taking a first one of the multiple time units on the second carrier as the second time unit for PUCCH transmission, i.e., determining that the PUCCH is transmitted in slot 2n on the second carrier, as shown in FIG. 5;
- manner 2: taking a last one of the multiple time units on the second carrier as the second time unit for PUCCH transmission, i.e., determining that the PUCCH is transmitted in slot 2n+1 on the second carrier, as shown in FIG. 6;
- manner 3: taking a first one of multiple time units on the second carrier that include available PUCCH resources as the second time unit for PUCCH transmission, where for example, when it is assumed that a PUCCH resource does not overlap with downlink symbols or SSB symbols configured by higher-layer signaling, i.e., there exists an available PUCCH resource in slot 2n, it is determined to transmit the PUCCH in slot 2n on the second carrier, as shown in FIG. 5; if it is assumed that there are no available PUCCH resource in slot 2n, while there is an available PUCCH resource in slot 2n+1 (such as the PUCCH resource does not overlap with the downlink symbols or SSB symbols configured by the higher-layer signaling), it is determined to transmit the PUCCH in slot 2n+1 on the second carrier, as shown in FIG. 6;
- manner 4: taking a last one of multiple time units on the second carrier that include available PUCCH resources as the second time unit for PUCCH transmission, where for example, assuming that there are available PUCCH resources in both slot 2n and slot 2n+1, it is determined to transmit the PUCCH in slot 2n+1 on the second carrier;
- manner 5: determining, as the second time unit, a time unit on the second carrier that overlaps with a starting symbol (or a starting time), based on the starting symbol (or the starting time) of the PUCCH in the first time unit of the first carrier, namely, determining to transmit the PUCCH in slot 2n on the second carrier, as shown in FIG. 5;
- manner 6: determining, as the second time unit, a time unit on the second carrier that overlaps with an ending symbol (or an ending time), based on the ending symbol (or the ending time) of the PUCCH in the first time unit of the first carrier, namely, determining that the PUCCH is transmitted in slot 2n+1 on the second carrier, as shown in FIG. 6;
- manner 7: determining, as the second time unit, a first one of time units that overlap with the first time unit and overlap with at least one symbol in a symbol set occupied by the PUCCH on the first carrier; and
- manner 8: determining, as the second time unit, a last one of time units that overlap with the first time unit and overlap with at least one symbol in a symbol set occupied by the PUCCH on the first carrier.

Fourth Example

Figure 7:
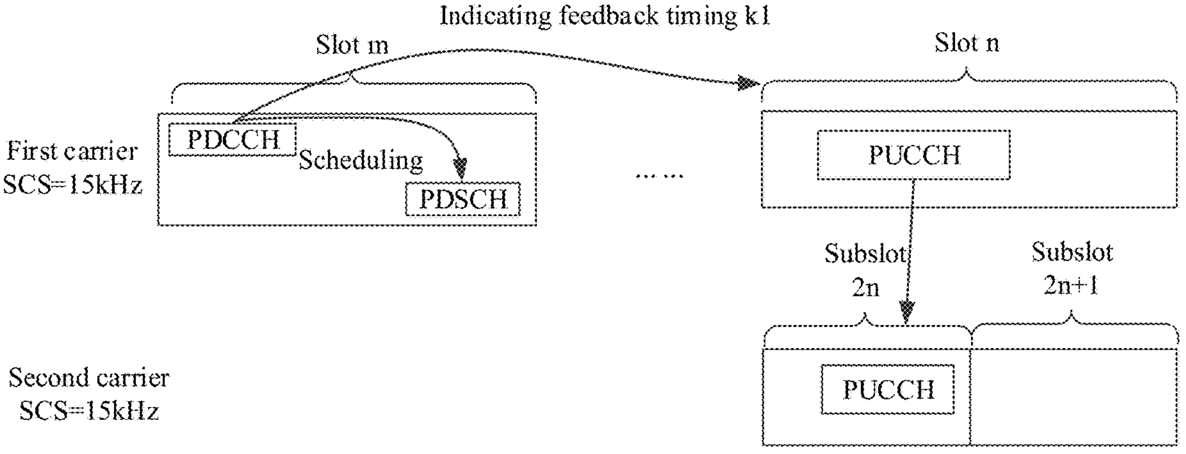
FIG. 7 is a fifth schematic diagram showing a position of a time unit for transmitting PUCCH during PUCCH carrier switching according to an embodiment of the present disclosure.
Figure 8:
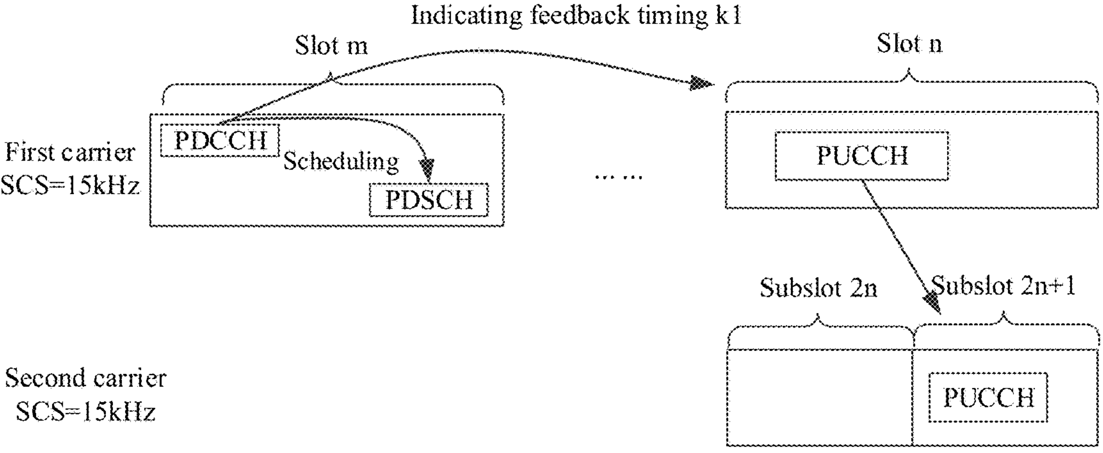
FIG. 8 is a sixth schematic diagram showing a position of a time unit for transmitting PUCCH during PUCCH carrier switching according to an embodiment of the present disclosure.

The first carrier is a carrier configured for transmitting a PUCCH before PUCCH carrier switching is performed, and the second carrier is a carrier that has the capability of transmitting the PUCCH after the carrier switching. The SCS of the first carrier and the SCS of the second carrier are the same, for example, both being 15 kHz or 30 kHz. The PUCCH is transmitted on the first carrier by using a slot as a transmission time unit, while the PUCCH is transmitted on the second carrier by using a subslot with a length of 7 symbols as the transmission time unit. It is determined that PUCCH carrier switching needs to be performed in slot n on the first carrier. According to manner (2) in the embodiments of the present disclosure, it may be determined that subslot n is the first time unit on the first carrier, and there exist multiple second time units on the second carrier that overlap with the first time unit, namely subslot 2n and subslot 2n+1, and a target time unit among multiple time units that overlap with the first time unit is determined as the second time unit. The target time unit may be determined in multiple manners as follows:

- manner 1: taking a first one of the multiple time units on the second carrier as the second time unit for PUCCH transmission, i.e., determining that the PUCCH is transmitted in subslot 2n on the second carrier, as shown in FIG. 7;
- manner 2: taking a last one of the multiple time units on the second carrier as the second time unit for PUCCH transmission, i.e., determining that the PUCCH is transmitted in subslot 2n+1 on the second carrier, as shown in FIG. 8;
- manner 3: taking a first one of multiple time units on the second carrier that include available PUCCH resources as the second time unit for PUCCH transmission, where for example, when it is assumed that a PUCCH resource does not overlap with downlink symbols or SSB symbols configured by higher-layer signaling, i.e., there exists an available PUCCH resource in subslot 2n, it is determined to transmit the PUCCH in subslot 2n on the second carrier, as shown in FIG. 7; if it is assumed that there are no available PUCCH resource in subslot 2n, while there is an available PUCCH resource in subslot 2n+1, it is determined to transmit the PUCCH in subslot 2n+1 on the second carrier, as shown in FIG. 8;
- manner 4: taking a last one of multiple time units on the second carrier that include available PUCCH resources as the second time unit for PUCCH transmission, where for example, assuming that there are available PUCCH resources in both subslot 2n and subslot 2n+1, it is determined to transmit the PUCCH in subslot 2n+1 on the second carrier;
- manner 5: determining, as the second time unit, a time unit on the second carrier that overlaps with a starting symbol (or a starting time), based on the starting symbol (or the starting time) of the PUCCH in the first time unit on the first carrier, namely, determining to transmit the PUCCH in subslot 2n on the second carrier, as shown in FIG. 7;
- manner 6: determining, as the second time unit, a time unit on the second carrier that overlaps with an ending symbol (or an ending time), based on the ending symbol (or the ending time) of the PUCCH in the first time unit on the first carrier, namely, determining that the PUCCH is transmitted in subslot 2n+1 on the second carrier, as shown in FIG. 8;

manner 7: determining, as the second time unit, a first one of time units that overlap with the first time unit and overlap with at least one symbol in a symbol set occupied by the PUCCH on the first carrier; and manner 8: determining, as the second time unit, a last one of time units that overlap with the first time unit and overlap with at least one symbol in a symbol set occupied by the PUCCH on the first carrier.

In the above embodiments of the present disclosure, some SCSs are just used as examples, and it is similar to a situation of replacing them with other SCSs, which will not be repeated herein. An example is just given above that the slot is the PUCCH transmission time unit, and the specific execution method in this example is similar to the method in a situation where the PUCCH transmission time unit is changed to subslot on any one carrier, or subslots with different quantities of symbols are used in time units on two carriers, for example, a transmission time unit of one carrier is a subslot of two symbols, and a transmission time unit of another carrier is a subslot of seven symbols, which will not be repeated herein. The above only gives an example that PDCCH carries a HARQ-ACK of a PDSCH with PDCCH scheduling, a situation where the PDSCH with the PDCCH scheduling is replaced with a PDCCH requiring a HARQ-ACK is similar, and the difference is that the HARQ-ACK in this situation may be the HARQ-ACK of PDCCH itself. It is similar to a situation where a PUCCH carries another UCI, and the difference may be that for CSI and/or SR, the first time unit on the first carrier where the PUCCH transmission is located and a specific resource involved are determined based on configuration of higher-layer signaling, and not based on notification by PDCCH.

The above first example to fourth example are described by taking only manner (1) and manner (2) as an example for determining the second time unit. It should be noted that the second time unit for the PUCCH transmission on the second carrier may also be determined according to manner (3) and manner (4), for example, determining the second time unit based on indication of a first indication field of DCI corresponding to a PUCCH that requires carrier switching, or, determining the second time unit based on pre-defined or pre-configured information of the first time unit. Specifically, the second time unit for transmitting the PUCCH on the second carrier may be directly determined in manner (3) and manner (4); or an offset value may be determined in manner (3) and manner (4), and the second time unit on the second carrier is determine based on the offset value and the first time unit. For example, the offset value is a symbol offset relative to a starting position of the first time unit, or, the offset value is a offset value relative to a first one of time units on the second carrier that overlap with the first time unit. For example, when the second carrier includes multiple time units overlapping with the first time unit, as shown in FIG. 5 to FIG. 8, whether the second time unit on the second carrier is a first one or a second one of two time units that overlap with the first time unit may be determined based on whether the offset value is 0 or 1.

The embodiments of the present disclosure are illustrated by taking a case of synchronous CA between different carriers as an example, that is, when boundaries of radio frames on different carriers are aligned, slot boundaries of different carriers having the same SCS are also aligned. It should be noted that it may also be applied in a case of asynchronous CA, that is, slot numbers between different carriers differ by a fixed offset value (offset). In this case, the difference lies in the fact that, when SCSs are the same, a slot of the second carrier aligned with slot n on the first carrier may not necessarily be slot n, but may be slot m, where m=n+offset, and offset is in unit of slot. In a case that subcarrier spacings are different, offset may be represented by the quantity of slots corresponding to a reference SCS. In the cases, it is still able to determine the corresponding second time unit on the second carrier by using the method of the embodiments of the present disclosure.

According to the embodiments of the present disclosure, when PUCCH carrier switching needs to be performed, a second time unit for PUCCH transmission on a second carrier after the switching is determined based on a first time unit for the PUCCH transmission on a first carrier before the PUCCH carrier switching. Therefore, a time unit for PUCCH transmission on a carrier after PUCCH carrier switching is determined without the need for notification or instruction by additional signaling, so as to ensure a normal implementation of transmission during PUCCH carrier switching without adding additional signaling overhead.

Figure 9:
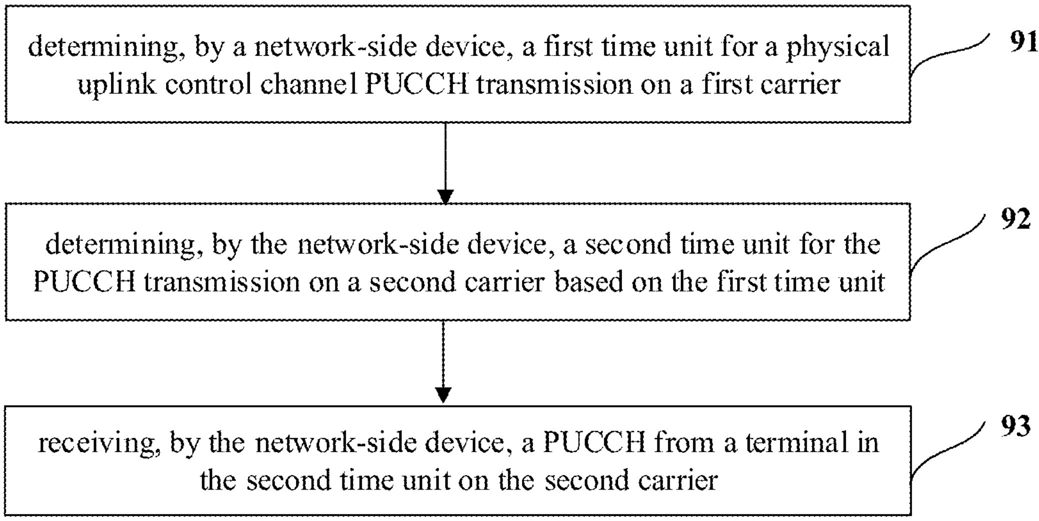
FIG. 9 is a second flow chart of a method for PUCCH transmission according to an embodiment of the present disclosure.

As shown in FIG. 9, an embodiment of the present disclosure provides a method for PUCCH transmission, applied to a network-side device, which specifically includes the following steps.

Step 91, determining, by the network-side device, a first time unit for a physical uplink control channel PUCCH transmission on a first carrier.

The first carrier is a carrier where a PUCCH is transmitted before the terminal performs PUCCH carrier switching, and the terminal determines to perform the PUCCH carrier switching in the first time unit of the first carrier. The first carrier is a carrier originally configured to transmit the PUCCH, such as PCell, PUCCH Scell, or PScell. The network-side device may determine a time unit position for transmitting the PUCCH on the first carrier, that is, determining the first time unit. The first time unit is the time unit position where the network-side device receives the PUCCH before the PUCCH carrier switching.

For example, for HARQ-ACK, a time unit (such as a slot or a subslot) where a PUCCH transmission carrying the HARQ-ACK is located may be determined based on a dynamic or semi-static feedback timing relationship. For CSI or SR, periodic transmission occasions may be determined based on a transmission period and an offset configured for a carrier where the PUCCH is originally transmitted. For example, for CSI, in a case that the configured period is 2 slots and the offset is 0 (i.e., an offset value relative to a first slot in a radio frame), it is determined that slots where a transmission of the CSI is located are slots #0, #2, #4, #6, #8, etc., in each radio frame.

Step 92, determining, by the network-side device, a second time unit for the PUCCH transmission on a second carrier based on the first time unit.

The second carrier is a carrier where the PUCCH is transmitted after the terminal performs the PUCCH carrier switching. The second carrier is a carrier that has the capability of transmitting the PUCCH through the PUCCH carrier switching. Specifically, the terminal is configured or allowed to perform PUCCH switching between the first carrier and the second carrier. The network-side device determines the second time unit for transmitting the PUCCH on the second carrier after carrier switching based on the first time unit, so that the PUCCH may be received on the second time unit on the second carrier after the carrier switching.

In an embodiment, the first carrier is switched to the second carrier. That is, the PUCCH is usually transmitted on the first carrier, and when a switching condition is met and carrier switching is required, the first carrier is switched to the second carrier to transmit the PUCCH.

Step 93, receiving, by the network-side device, a PUCCH from a terminal in the second time unit on the second carrier.

After the second time unit for the PUCCH transmission on the second carrier has been determined based on the first time unit for the PUCCH transmission on the first carrier, the network-side device receives the PUCCH by using the second time unit on the second carrier, to complete the PUCCH transmission after the PUCCH carrier switching. In this case, the terminal no longer transmits the PUCCH in the first time unit of the first carrier, and the behavior of the PUCCH transmission is performed in the second time unit on the second carrier as switched.

In the first time unit where PUCCH needs to be transmitted on the first carrier, when it is determined that the PUCCH carrier switching is required, a target carrier after the PUCCH carrier switching may be determined as the second carrier according to a predetermined rule. The second time unit on the second carrier is determined based on the first time unit on the first carrier, and the PUCCH is received in the second time unit on the second carrier. Information carried by the PUCCH transmitted in the second time unit on the second carrier is UCI (or may be only a portion of the information) on the PUCCH that needs to be transmitted in the first time unit of the first carrier before the PUCCH carrier switching is performed. Therefore, after the PUCCH carrier switching, there is no need to perform the PUCCH transmission in the first time unit of the first carrier, thereby to achieve PUCCH transmission from one carrier to another carrier.

It should be noted that when the second time unit on the second carrier is switched for PUCCH transmission, a specific time-domain resource (such as the positions and the quantity of specific symbols occupied in the second time unit) and a frequency-domain resource (such as the quantity and positions of RBs, as well as a code-domain resource (such as orthogonal sequence, cyclic shift, and other parameters) of the PUCCH transmitted in the second time unit on the second carrier may be determined according to another rule, which is not particularly defined herein.

According to the embodiment of the present disclosure, when PUCCH carrier switching needs to be performed, the second time unit for PUCCH transmission on the second carrier after the switching is determined based on the first time unit for the PUCCH transmission on the first carrier before the PUCCH carrier switching. Therefore, a time unit for PUCCH transmission on a carrier after PUCCH carrier switching is determined without the need for notification or instruction by additional signaling, so as to ensure a normal implementation of transmission during PUCCH carrier switching without adding additional signaling overhead.

If a terminal is configured or allowed to perform PUCCH carrier switching between the first carrier and the second carrier, a position where the network-side device receives a PUCCH will change after the carrier switching. For example, the first time unit of the first carrier where the terminal transmits a PUCCH is switched to the second time unit on the second carrier where the terminal transmits a PUCCH, and the network-side device switches from the first time unit of the first carrier where the PUCCH is initially received to the second time unit on the second carrier to receive the PUCCH.

Furthermore, the determining the second time unit for the PUCCH transmission on the second carrier based on the first time unit may include one of the following manners.

Manner (1) includes: determining a time unit on the second carrier that overlaps with the first time unit as the second time unit.

Manner (2) includes: determining a target time unit of time units on the second carrier that overlap with the first time unit as the second time unit.

The second time unit may be a specific time unit among the time units that overlap with the first time unit on the first carrier. For example, in the case that SCS of the first carrier is smaller or a PUCCH transmission time unit of the first carrier is larger, there may exist multiple second time units overlapping with one first time unit. In this case, a specific time unit (i.e., the target time unit) from the multiple second time units may be used as the time unit for PUCCH transmission on the second carrier after PUCCH carrier switching.

Specifically, the target time unit may include one of the following:

- a first one of the time units that overlap with the first time unit;
- a last one of the time units that overlap with the first time unit;
- a first one of time units that overlap with the first time unit and include available PUCCH resources;
- a last one of time units that overlap with the first time unit and include available PUCCH resources;
- a time unit that overlaps with the first time unit and overlaps with a starting symbol of the PUCCH on the first carrier;
- a time unit that overlaps with the first time unit and overlaps with a starting time of the PUCCH on the first carrier;
- a time unit that overlaps with the first time unit and overlaps with an ending symbol of the PUCCH on the first carrier;
- a time unit that overlaps with the first time unit and overlaps with an ending time of the PUCCH on the first carrier;
- a first one of time units that overlap with the first time unit and overlap with at least one symbol in a symbol set occupied by the PUCCH on the first carrier;
- a last one of time units that overlap with the first time unit and overlap with at least one symbol in a symbol set occupied by the PUCCH on the first carrier.

The symbols occupied by the PUCCH on the first carrier may be multiple symbols in the time domain, and different symbols may overlap with different time units, so, there is a situation where multiple time units overlap with the symbols occupied by the PUCCH. In this situation, one of the time units may be selected as the target time unit, for example, selecting the first one or the last one of the time units that overlap with the at least one symbol in the symbol set occupied by the PUCCH on the first carrier.

The available PUCCH resource is a PUCCH resource that meets a first condition. The first condition includes at least one of the following:

- not overlapping with downlink symbols of the second carrier;
- not overlapping with symbols occupied by a synchronization signal and physical broadcast channel PBCH block SSB on the second carrier;
- not overlapping, in a time domain, with an uplink transmission on the second carrier that is configured by higher-layer signaling, where the uplink transmission configured by the higher-layer signaling refers to an uplink transmission without the trigger of PDCCH scheduling, such as semi-static uplink transmission including SRS, SP-CSI, CG PUSCH, etc;

not overlapping, in a frequency domain, with the uplink transmission on the second carrier that is configured by the higher-layer signaling; or meeting a requirement of a preparation time for information carried by the PUCCH.

For example, the meeting the requirement of the preparation time for the information carried by the PUCCH means that when a HARQ-ACK is transmitted on the PUCCH, a fixed time interval needs to be met between an ending position of HARQ-ACK downlink transmission performed on the PUCCH and a start position of the PUCCH, where the time interval is a time required for PDSCH processing and for preparation to transmit HARQ-ACK on PUCCH.

For example, it is defined as: $T_{proc,1}=((N_1+d_{1,1}+d_{1,2})(2048+144)\cdot\kappa 2^{-\mu})\cdot T_c$, where $N_1$ is a processing time related to a processing capability of PDSCH that needs to perform HARQ-ACK feedback, a numerical value is selected in a list of the processing capability according to a reference μ, κ is a ratio of a LTE sampling time to a NR sampling time, μ is an index of SCS, the reference μ is a minimum value of μ corresponding to PUCCH scheduling PDSCH, PDSCH itself, or PUCCH itself, $T_C$ is the NR sampling time, and $d_{1,1}$ is an offset value of processing times of HARQ-ACK transmissions on different uplink channels. In a case that a transmission is performed on PUCCH, $d_{1,1}=0$. In a case that a transmission is performed on PDSCH, $d_{1,1}=1$, and $d_{1,2}$ represents an offset of processing time related to the quantity of symbols occupied by the PDSCH.

Manner (3) includes: determining the second time unit based on indication information of a first indication field of downlink control information DCI corresponding to a PUCCH that requires carrier switching.

Specifically, the indication information of the first indication field may include one of the following: information of the second time unit; a time-domain offset relative to a time-domain position of the PUCCH on the first carrier; a time-domain offset relative to the first time unit of the first carrier.

In the embodiment of the present disclosure, for a PUCCH with a corresponding DCI, during PUCCH carrier switching, the second time unit for transmitting the PUCCH on the second carrier may be determined based on the first indication field in the DCI. The first indication field may be a reuse of an existing indication field included in the DCI or a newly added indication field. The first indication field is used to indicate a second time unit on a second carrier, or to indicate a time-domain offset relative to the time-domain position of the PUCCH on the first carrier, or to indicate a time-domain offset relative to the first time unit on the first carrier. The unit of the time-domain offset may be a symbol or a PUCCH transmission time unit, and the unit of the symbol or the PUCCH transmission time unit is the unit corresponding to the second carrier.

Manner (4) includes: determining the second time unit based on pre-configured information of the first time unit.

Specifically, the pre-configured information of the first time unit includes one of the following: information of the second time unit, a time-domain offset relative to a time-domain position of the PUCCH on the first carrier, a time-domain offset relative to the first time unit of the first carrier.

In the embodiment of the present disclosure, each of the first time units on the first carrier that are capable of performing PUCCH switching may be predefined or pre-configured with a corresponding second time unit on the second carrier, or a time-domain offset value may be predefined or pre-configured. The time-domain offset value is used to indicate a time-domain offset of the PUCCH on the second carrier relative to the time-domain position of the PUCCH on the first carrier, or to indicate a time-domain offset relative to the first time unit. The unit of the time-domain offset may be a symbol or a PUCCH transmission time unit, and the unit of the symbol or the PUCCH transmission time unit is the unit corresponding to the second carrier.

Optionally, a subcarrier spacing SCS of the second carrier is larger than or equal to a SCS of the first carrier. The SCS of the second carrier is equal to the SCS of the first carrier, or, the SCS of the first carrier is not greater than the SCS of the second carrier. For example, in a case that the SCS of the second carrier is 15 kHz, the SCS of the first carrier is also 15 kHz. For another example, the SCS of the second carrier is 30 kHz, and the SCS of the first carrier may be 15 kHz or 30 kHz, etc.

Optionally, the unit of the first time unit is the same as the unit of the second time unit. For example, the units of the first time unit and the second time unit are both slots, or both are subslots of the same length. Alternatively, the unit of the first time unit is different from the unit of the second time unit. For example, the quantity of symbols contained in the first time unit is less than or equal to the quantity of symbols contained in the second time unit. For example, in a case that the PUCCH transmission time unit of the first carrier is a slot, the PUCCH transmission time unit of the second carrier is also a slot. In a case that the PUCCH transmission time unit of the first carrier is a subslot with a length of 7 symbols, the PUCCH transmission time unit of the second carrier may be a slot or a subslot with a length of 7 symbols, but cannot be a subslot with a length of 2 symbols.

In the embodiment of the present disclosure, the transmission time unit may be in unit of slot or subslot, and subslots may have different lengths, such as a subslot of 2 symbols or a subslot of 7 symbols. In a case that the PUCCH transmission time unit of the second carrier is not configured with a unit, it is determined to perform the transmission according to the same unit as the PUCCH transmission time unit of the first carrier or a pre-agreed PUCCH transmission time unit.

The implementation process of the method for PUCCH transmission applied to the network-side device in the present disclosure is the same as or similar to the implementation process of the method for PUCCH transmission applied to the terminal, and reference is made to the first example to the fourth example, which is not repeated herein. It is noted that the first example to fourth example are described by taking only manner (1) and manner (2) as an example for determining the second time unit. It should be noted that the second time unit for the PUCCH transmission on the second carrier may also be determined according to manner (3) and manner (4), for example, determining the second time unit based on indication of a first indication field of DCI corresponding to a PUCCH that requires carrier switching, or, determining the second time unit based on pre-defined or pre-configured information of the first time unit. Specifically, the second time unit for transmitting the PUCCH on the second carrier may be directly determined in manner (3) and manner (4); or an offset value may be determined in manner (3) and manner (4), and the second time unit on the second carrier is determine based on the offset value and the first time unit.

The embodiments of the present disclosure are illustrated by taking a case of synchronous CA between different carriers as an example, that is, when boundaries of radio frames on different carriers are aligned, slot boundaries of different carriers having the same SCS are also aligned. It should be noted that it may also be applied in a case of asynchronous CA, that is, slot numbers between different carriers differ by a fixed offset. In this case, the difference lies in when fact that, if SCSs are the same, a slot of the second carrier aligned with slot n on the first carrier may not necessarily be slot n, but may be slot m, where m=n+offset, and offset is in unit of slot. In a case that subcarrier spacings are different, offset may be represented by the quantity of slots corresponding to a reference SCS. In the cases, it is still able to determine the second time unit on the second carrier by using the method of the embodiments of the present disclosure.

In the method for PUCCH transmission according to the embodiment of the present disclosure, the second time unit for PUCCH transmission on the second carrier is determined based on the first time unit, which is applicable to the terminal and the network-side device. That is, the method of determining the second time unit for PUCCH transmission on the second carrier by the terminal is also applicable to the embodiments of determining the second time unit for PUCCH transmission on the second carrier by the network-side device, which is not repeated herein. In the method for PUCCH transmission according to the embodiments of the present disclosure, after determining the second time unit on the second carrier, the terminal transmits a PUCCH in the second time unit, and the network-side device receives the PUCCH in the second time unit.

The positioning method of the present disclosure is introduced in the above embodiments, and the corresponding apparatus will be further explained in the following embodiments with reference to the accompanying drawings.

Figure 10:
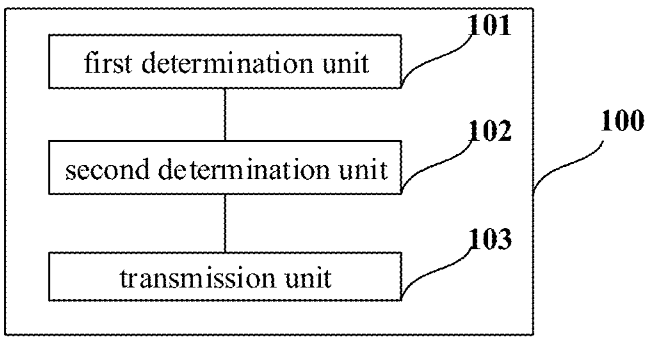
FIG. 10 shows a first schematic structural diagrams of an apparatus for PUCCH transmission according to an embodiment of the present disclosure.

Specifically, as shown in FIG. 10, an embodiment of the present disclosure provides an apparatus 100 for PUCCH transmission, applied to a terminal, which includes:

- a first determination unit 101, configured to determine a first time unit for a physical uplink control channel PUCCH transmission on a first carrier;
- a second determination unit 102, configured to determine a second time unit for the PUCCH transmission on a second carrier based on the first time unit; and
- a transmission unit 103, configured to transmit a PUCCH in the second time unit on the second carrier,
- where the first carrier is a carrier where the PUCCH is transmitted before PUCCH carrier switching is performed by a terminal, the second carrier is a carrier where the PUCCH is transmitted after the PUCCH carrier switching is performed by the terminal, and the terminal determines to perform the PUCCH carrier switching in the first time unit of the first carrier.

Optionally, the second determination unit 102 specifically includes one of the following:

- a first determination subunit, configured to determine a time unit on the second carrier that overlaps with the first time unit as the second time unit;
- a second determination subunit, configured to determine a target time unit of time units on the second carrier that overlap with the first time unit as the second time unit;
- a third determination subunit, configured to determine the second time unit based on indication information of a first indication field of downlink control information DCI corresponding to a PUCCH that requires carrier switching;
- a fourth determination subunit, configured to determine the second time unit based on pre-configured information of the first time unit.

Optionally, the target time unit includes one of the following:

- a first one of the time units that overlap with the first time unit;
- a last one of the time units that overlap with the first time unit;
- a first one of time units that overlap with the first time unit and include available PUCCH resources;
- a last one of time units that overlap with the first time unit and include available PUCCH resources;
- a time unit that overlaps with the first time unit and overlaps with a starting symbol of the PUCCH on the first carrier;
- a time unit that overlaps with the first time unit and overlaps with a starting time of the PUCCH on the first carrier;
- a time unit that overlaps with the first time unit and overlaps with an ending symbol of the PUCCH on the first carrier;
- a time unit that overlaps with the first time unit and overlaps with an ending time of the PUCCH on the first carrier;
- a first one of time units that overlap with the first time unit and overlap with at least one symbol in a symbol set occupied by the PUCCH on the first carrier;
- a last one of time units that overlap with the first time unit and overlap with at least one symbol in a symbol set occupied by the PUCCH on the first carrier.

Optionally, the indication information of the first indication field includes one of the following: information of the second time unit; a time-domain offset relative to a time-domain position of the PUCCH on the first carrier; a time-domain offset relative to the first time unit of the first carrier.

Optionally, the pre-configured information of the first time unit includes one of the following: information of the second time unit; a time-domain offset relative to a time-domain position of the PUCCH on the first carrier; a time-domain offset relative to the first time unit of the first carrier.

Optionally, the available PUCCH resource is a PUCCH resource that meets a first condition; the first condition includes at least one of the following:

- not overlapping with downlink symbols of the second carrier;
- not overlapping with symbols occupied by a synchronization signal and physical broadcast channel PBCH block SSB on the second carrier;
- not overlapping, in a time domain, with an uplink transmission on the second carrier that is configured by higher-layer signaling;
- not overlapping, in a frequency domain, with the uplink transmission on the second carrier that is configured by the higher-layer signaling; or
- meeting a requirement of a preparation time for information carried by the PUCCH.

Optionally, a subcarrier spacing SCS of the second carrier is larger than or equal to a SCS of the first carrier.

Optionally, a unit of the first time unit is the same as a unit of the second time unit; or the quantity of symbols contained in the first time unit is less than or equal to the quantity of symbols contained in the second time unit.

According to the embodiment of the present disclosure, when PUCCH carrier switching needs to be performed, the second time unit for PUCCH transmission on the second carrier after the switching is determined based on the first time unit for the PUCCH transmission on the first carrier before the PUCCH carrier switching. Therefore, a time unit for PUCCH transmission on a carrier after PUCCH carrier switching is determined without the need for notification or instruction by additional signaling, so as to ensure a normal implementation of transmission during PUCCH carrier switching without adding additional signaling overhead.

It should be noted that the above apparatus in the embodiments of the present disclosure is capable of implementing all method steps in the method implemented in the above method embodiments applied to the terminal, and is capable of achieving the same technical effects. Therefore, the description and beneficial effects of this embedment that are the same as those of the method embodiments will not be further elaborated in detail.

Figure 11:
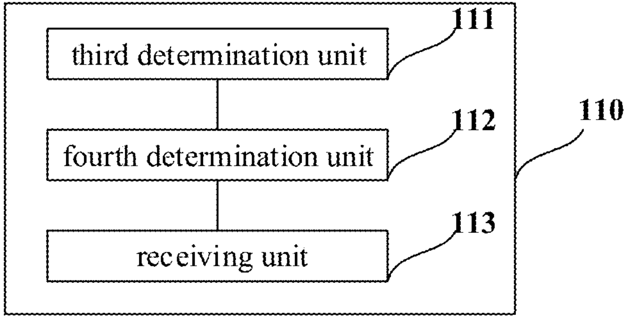
FIG. 11 shows a second schematic structural diagrams of an apparatus for PUCCH transmission according to an embodiment of the present disclosure.

As shown in FIG. 11, an embodiment of the present disclosure provides an apparatus 110 for PUCCH transmission, applied to a network-side device, which includes:

a third determination unit 111, configured to determine a first time unit for a physical uplink control channel PUCCH transmission on a first carrier;

a fourth determination unit 112, configured to determine a second time unit for the PUCCH transmission on a second carrier based on the first time unit; and a receiving unit 113, configured to receive a PUCCH from a terminal in the second time unit on the second carrier, where the first carrier is a carrier where the PUCCH is transmitted before PUCCH carrier switching is performed by the terminal, the second carrier is a carrier where the PUCCH is transmitted after the PUCCH carrier switching is performed by the terminal, and the terminal determines to perform the PUCCH carrier switching in the first time unit of the first carrier.

Optionally, the fourth determination unit 112 specifically includes one of the following:

a fifth determination subunit, configured to determine a time unit on the second carrier that overlaps with the first time unit as the second time unit;

a sixth determination subunit, configured to determine a target time unit of time units on the second carrier that overlap with the first time unit as the second time unit;

a seventh determination subunit, configured to determine the second time unit based on indication information of a first indication field of downlink control information DCI corresponding to a PUCCH that requires carrier switching;

an eighth determination subunit, configured to determine the second time unit based on pre-configured information of the first time unit.

Optionally, the target time unit includes one of the following:

a first one of the time units that overlap with the first time unit;

a last one of the time units that overlap with the first time unit;

a first one of time units that overlap with the first time unit and include available PUCCH resources;

a last one of time units that overlap with the first time unit and include available PUCCH resources;

a time unit that overlaps with the first time unit and overlaps with a starting symbol of the PUCCH on the first carrier;

a time unit that overlaps with the first time unit and overlaps with a starting time of the PUCCH on the first carrier;

a time unit that overlaps with the first time unit and overlaps with an ending symbol of the PUCCH on the first carrier;

a time unit that overlaps with the first time unit and overlaps with an ending time of the PUCCH on the first carrier;

a first one of time units that overlap with the first time unit and overlap with at least one symbol in a symbol set occupied by the PUCCH on the first carrier;

a last one of time units that overlap with the first time unit and overlap with at least one symbol in a symbol set occupied by the PUCCH on the first carrier.

Optionally, the indication information of the first indication field includes one of the following: information of the second time unit, a time-domain offset relative to a time-domain position of the PUCCH on the first carrier, a time-domain offset relative to the first time unit of the first carrier.

Optionally, the pre-configured information of the first time unit includes one of the following: information of the second time unit, a time-domain offset relative to a time-domain position of the PUCCH on the first carrier, a time-domain offset relative to the first time unit of the first carrier.

Optionally, the available PUCCH resource is a PUCCH resource that meets a first condition; the first condition includes at least one of the following:

not overlapping with downlink symbols of the second carrier;

not overlapping with symbols occupied by a synchronization signal and physical broadcast channel PBCH block SSB on the second carrier;

not overlapping, in a time domain, with an uplink transmission on the second carrier that is configured by higher-layer signaling;

not overlapping, in a frequency domain, with the uplink transmission on the second carrier that is configured by the higher-layer signaling; or meeting a requirement of a preparation time for information carried by the PUCCH.

Optionally, a subcarrier spacing SCS of the second carrier is larger than or equal to a SCS of the first carrier.

Optionally, a unit of the first time unit is the same as a unit of the second time unit, or, the quantity of symbols contained in the first time unit is less than or equal to the quantity of symbols contained in the second time unit.

According to the embodiment of the present disclosure, when PUCCH carrier switching needs to be performed, the second time unit for PUCCH transmission on the second carrier after the switching is determined based on the first time unit for the PUCCH transmission on the first carrier before the PUCCH carrier switching. Therefore, a time unit for PUCCH transmission on a carrier after PUCCH carrier switching is determined without the need for notification or instruction by additional signaling, so as to ensure a normal implementation of transmission during PUCCH carrier switching without adding additional signaling overhead.

It should be noted that the above apparatus in the embodiments of the present disclosure is capable of implementing all method steps in the method implemented in the above method embodiments applied to the network-side device, and is capable of achieving the same technical effects. Therefore, the description and beneficial effects of this embedment that are the same as those of the method embodiments will not be further elaborated in detail.

It should be noted that the division of units in the embodiments of the present disclosure is illustrative, and is only a logical function division, and there may be another division manner in actual implementation. In addition, the functional units in various embodiments of the present disclosure may be integrated into one processing unit, or each unit may exist separately physically, or two or more units may be integrated into one unit. The above-mentioned integrated units may be implemented in the form of hardware or in the form of software functional units.

If the integrated unit is implemented in the form of a software function unit and sold or used as an independent product, it can be stored in a processor-readable storage medium. Based on such an understanding, essential parts, or parts contributing to the related art, of the technical solution of the present disclosure, or all or a part of the technical solution may be implemented in a form of a software product. The computer software product is stored in a storage medium, and includes several instructions to enable a computer device (which may be a personal computer, a server, or a network device, etc.) or a processor (processor) to execute all or part of the steps of the methods described in the various embodiments of the present disclosure. The aforementioned storage media include: a universal serial bus (USB) flash drive, removable hard disk, read-only memory (Read-Only Memory, ROM), random access memory (Random Access Memory, RAM), magnetic disk, optical disc or other media that can store program codes.

Figure 12:
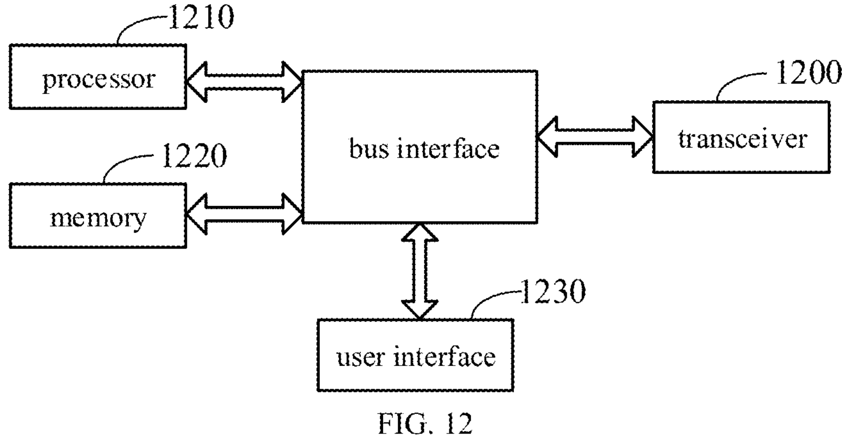
FIG. 12 shows a schematic structural diagram of a terminal according to an embodiment of the present disclosure.

As shown in FIG. 12, an embodiment of the present disclosure further provides a terminal, which includes a memory 1220, a transceiver 1200 and a processor 1210. The memory 1220 is configured to store a computer program; the transceiver 1200 is configured to transmit and receive data under control of the processor 1210. The processor 1210 is configured to read the computer program in the memory to perform following operations:

determining a first time unit for a physical uplink control channel PUCCH transmission on a first carrier; and determining a second time unit for the PUCCH transmission on a second carrier based on the first time unit.

The transceiver 1200 is configured to transmit a PUCCH in the second time unit on the second carrier. The first carrier is a carrier where the PUCCH is transmitted before PUCCH carrier switching is performed by the terminal, the second carrier is a carrier where the PUCCH is transmitted after the PUCCH carrier switching is performed by the terminal, and the terminal determines to perform the PUCCH carrier switching in the first time unit of the first carrier.

Optionally, the determining the second time unit for the PUCCH transmission on the second carrier based on the first time unit includes one of the following:

determining a time unit on the second carrier that overlaps with the first time unit as the second time unit;

determining a target time unit of time units on the second carrier that overlap with the first time unit as the second time unit;

determining the second time unit based on indication information of a first indication field of downlink control information DCI corresponding to a PUCCH that requires carrier switching;

determining the second time unit based on pre-configured information of the first time unit.

Optionally, the target time unit includes one of the following:

a first one of the time units that overlap with the first time unit;

a last one of the time units that overlap with the first time unit;

a first one of time units that overlap with the first time unit and include available PUCCH resources;

a last one of time units that overlap with the first time unit and include available PUCCH resources;

a time unit that overlaps with the first time unit and overlaps with a starting symbol of the PUCCH on the first carrier;

a time unit that overlaps with the first time unit and overlaps with a starting time of the PUCCH on the first carrier;

a time unit that overlaps with the first time unit and overlaps with an ending symbol of the PUCCH on the first carrier;

a time unit that overlaps with the first time unit and overlaps with an ending time of the PUCCH on the first carrier;

a first one of time units that overlap with the first time unit and overlap with at least one symbol in a symbol set occupied by the PUCCH on the first carrier;

a last one of time units that overlap with the first time unit and overlap with at least one symbol in a symbol set occupied by the PUCCH on the first carrier.

Optionally, the indication information of the first indication field includes one of the following: information of the second time unit; a time-domain offset relative to a time-domain position of the PUCCH on the first carrier; a time-domain offset relative to the first time unit of the first carrier.

Optionally, the pre-configured information of the first time unit includes one of the following: information of the second time unit; a time-domain offset relative to a time-domain position of the PUCCH on the first carrier; a time-domain offset relative to the first time unit of the first carrier.

Optionally, the available PUCCH resource is a PUCCH resource that meets a first condition; the first condition includes at least one of the following:

not overlapping with downlink symbols of the second carrier;

not overlapping with symbols occupied by a synchronization signal and physical broadcast channel PBCH block SSB on the second carrier;

not overlapping, in a time domain, with an uplink transmission on the second carrier that is configured by higher-layer signaling;

not overlapping, in a frequency domain, with the uplink transmission on the second carrier that is configured by the higher-layer signaling; or meeting a requirement of a preparation time for information carried by the PUCCH.

Optionally, a subcarrier spacing SCS of the second carrier is larger than or equal to a SCS of the first carrier.

Optionally, a unit of the first time unit is the same as a unit of the second time unit; or the quantity of symbols contained in the first time unit is less than or equal to the quantity of symbols contained in the second time unit.

It should be noted that in FIG. 12, a bus architecture may include any quantity of interconnected buses and bridges, and connects various circuits including one or more processors represented by the processor 1210 and memory represented by the memory 1220. The bus architecture may also connect various other circuits such as peripherals, voltage regulators and power management circuits, which is well known in the art. Therefore, a detailed description thereof is omitted herein. A bus interface provides an interface. The transceiver 1200 may be multiple elements, i.e., a transmitter and a receiver, to allow for communication with various other apparatuses on the transmission medium. For different terminals, the user interface 1230 may be an interface capable of externally or internally connecting a required device, and the connected device includes, but is not limited to: a keypad, a display, a speaker, a microphone, a joystick and the like. The processor 1210 is responsible for supervising the bus architecture and normal operation and the memory 1220 may store the data being used by the processor 1210 during operation.

Optionally, the processor 1210 may be a central processing unit (Central Processing Unit, CPU), an application specific integrated circuit (Application Specific Integrated Circuit, ASIC), a field-programmable gate array (Field-Programmable Gate Array, FPGA) or a complex programmable logic device (Complex Programmable Logic Device, CPLD). The processor may also adopt a multi-core architecture.

The processor is configured to execute any of the methods provided in the embodiments of the present disclosure according to the obtained executable instructions by calling a computer program stored in the memory. The processor and memory may also be arranged to be separated physically.

It should be noted that the above terminal provided in the embodiments of the present disclosure is capable of implementing all method steps in the method implemented in the above method embodiments applied to the terminal, and is capable of achieving the same technical effects. Therefore, the description and beneficial effects of this embedment that are the same as those of the method embodiments will not be further elaborated in detail.

Figure 13:
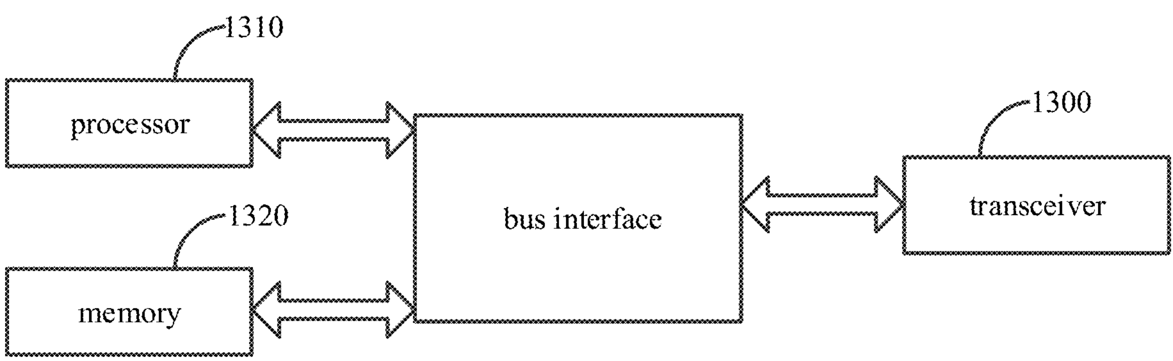
FIG. 13 shows a schematic structural diagram of a network-side device according to an embodiment of the present disclosure.

As shown in FIG. 13, an embodiment of the present disclosure further provides a network-side device, which includes: a memory 1320, a transceiver 1300 and a processor 1310. The memory 1320 is configured to store a computer program; a transceiver 1300 is configured to transmit and receive data under the control of the processor 1310; the processor is configured to read the computer program in the memory to perform the following operations:

determining a first time unit for a physical uplink control channel PUCCH transmission on a first carrier; and determining a second time unit for the PUCCH transmission on a second carrier based on the first time unit;

the transceiver 1300 is configured to receive a PUCCH from a terminal in the second time unit on the second carrier, where the first carrier is a carrier where the PUCCH is transmitted before PUCCH carrier switching is performed by the terminal, the second carrier is a carrier where the PUCCH is transmitted after the PUCCH carrier switching is performed by the terminal, and the terminal determines to perform the PUCCH carrier switching in the first time unit of the first carrier.

Optionally, the determining the second time unit for the PUCCH transmission on the second carrier based on the first time unit includes one of the following:

determining a time unit on the second carrier that overlaps with the first time unit as the second time unit;

determining a target time unit of time units on the second carrier that overlap with the first time unit as the second time unit;

determining the second time unit based on indication information of a first indication field of downlink control information DCI corresponding to a PUCCH that requires carrier switching;

determining the second time unit based on pre-configured information of the first time unit.

Optionally, the target time unit includes one of the following:

a first one of the time units that overlap with the first time unit;

a last one of the time units that overlap with the first time unit;

a first one of time units that overlap with the first time unit and include available PUCCH resources;

a last one of time units that overlap with the first time unit and include available PUCCH resources;

a time unit that overlaps with the first time unit and overlaps with a starting symbol of the PUCCH on the first carrier;

a time unit that overlaps with the first time unit and overlaps with a starting time of the PUCCH on the first carrier;

a time unit that overlaps with the first time unit and overlaps with an ending symbol of the PUCCH on the first carrier;

a time unit that overlaps with the first time unit and overlaps with an ending time of the PUCCH on the first carrier;

a first one of time units that overlap with the first time unit and overlap with at least one symbol in a symbol set occupied by the PUCCH on the first carrier;

a last one of time units that overlap with the first time unit and overlap with at least one symbol in a symbol set occupied by the PUCCH on the first carrier.

Optionally, the indication information of the first indication field includes one of the following:

information of the second time unit;

a time-domain offset relative to a time-domain position of the PUCCH on the first carrier;

a time-domain offset relative to the first time unit of the first carrier.

Optionally, the pre-configured information of the first time unit includes one of the following: information of the second time unit; a time-domain offset relative to a time-domain position of the PUCCH on the first carrier; a time-domain offset relative to the first time unit of the first carrier.

Optionally, the available PUCCH resource is a PUCCH resource that meets a first condition; the first condition includes at least one of the following:

not overlapping with downlink symbols of the second carrier;

not overlapping with symbols occupied by a synchronization signal and physical broadcast channel PBCH block SSB on the second carrier;

not overlapping, in a time domain, with an uplink transmission on the second carrier that is configured by higher-layer signaling;

not overlapping, in a frequency domain, with the uplink transmission on the second carrier that is configured by the higher-layer signaling; or meeting a requirement of a preparation time for information carried by the PUCCH.

Optionally, a subcarrier spacing SCS of the second carrier is larger than or equal to a SCS of the first carrier.

Optionally, a unit of the first time unit is the same as a unit of the second time unit; or the quantity of symbols contained in the first time unit is less than or equal to the quantity of symbols contained in the second time unit.

In FIG. 13, a bus architecture may include any quantity of interconnected buses and bridges, and connects various circuits including one or more processors represented by the processor 1310 and memory represented by the memory 1320. The bus architecture may also connect various other circuits such as peripherals, voltage regulators and power management circuits, which is well known in the art. Therefore, a detailed description thereof is omitted herein. A bus interface provides an interface. The transceiver 1300 may be multiple elements, i.e., a transmitter and a receiver, to allow for communication with various other apparatuses on the transmission medium. The processor 1310 is responsible for supervising the bus architecture and normal operation and the memory 1320 may store the data being used by the processor 1210 during operation.

The processor 1310 may be a central processing unit (CPU), an application specific integrated circuit (Application Specific Integrated Circuit, ASIC), a field-programmable gate array (Field-Programmable Gate Array, FPGA) or a complex programmable logic device (Complex Programmable Logic Device, CPLD). The processor may also adopt a multi-core architecture.

It should be noted that the above network-side device in the embodiment of the present disclosure is capable of implementing all steps of the method implemented in the above method embodiments applied to the network-side device, and is capable of achieving the same technical effects. Therefore, the parts and beneficial effects of this embedment that are the same as the method embodiments will not be further elaborated herein in detail.

In addition, a specific embodiment of the present disclosure further provides a readable storage medium, storing a computer program. The computer program is configured to be executed by a processor to implement steps of the method for PUCCH transmission as described above, and can achieve the same technical effects, which will not be repeated herein to avoid repetition. The readable storage medium may be any available medium or data storage device that can be accessed by the processor, including but not limited to magnetic storage (such as floppy disk, hard disk, magnetic tape, magneto-optical disk (MO)), optical storage (such as compact disc (CD), digital versatile disc (DVD), blue-ray disc (BD), high-definition versatile disc (HVD)), and semiconductor memory (such as ROM, EPROM, EEPROM, non-volatile memory (NAND FLASH), solid-state drive (SSD)), etc.

In addition, the specific embodiment of the present disclosure also provides a processor readable storage medium on which a computer program is stored. When the program is executed by the processor, the steps of the method for PUCCH transmission as described above are implemented. And it may achieve the same technical effect. To avoid repetition, it will not be repeated here. Among them, the readable storage medium may be any available medium or data storage device that the processor may access, including but not limited to magnetic memory (such as floppy disks, hard disks, magnetic tapes, magneto-optical disks (MO), etc.), optical memory (such as CDs, DVDs, BD, HVDs, etc.), and semiconductor memory (such as ROM, EPROM, EEPROM, non-volatile memory (NAND FLASH), solid-state drive (SSD), etc.).

Those skilled in the art should appreciate that the embodiments of the present disclosure may be provided as a method, a system, or a computer program product. Therefore, the present disclosure may take the form of complete hardware embodiments, complete software embodiments, or embodiments combining software and hardware. Moreover, the present disclosure may take the form of a computer program product implemented on one or more computer available storage media (including but not limited to disk storage, optical storage, etc.) including a computer available program code.

The present disclosure is described with reference to the flow chart and/or the block diagram of the method, device (system), and computer program product according to the embodiments of the present disclosure. It should be appreciated that each of processes and/or boxes in a flow chart and/or block diagram, and a combination of the processes and/or boxes in the flow chart and/or block diagram may be implemented by computer executable instructions. These computer executable instructions may be provided to a processor of a general-purpose computer, a specialized computer, an embedded processing device, or other programmable data processing devices to generate a machine that generates instructions executed by the processor of computer or other programmable data processing devices to implement functions specified in one or more processes and/or blocks in a flow chart.

These processor executable instructions may also be stored in processor-readable memory that may guide computers or other programmable data processing devices to work in a specific way, causing the instructions stored in the processor readable memory to generate a manufacturing product including instruction devices that implement the functions specified in one or more processes and/or blocks of a flow chart.

These processor executable instructions may also be loaded onto a computer or other programmable data processing device, enabling a series of operational steps to be performed on the computer or other programmable device to generate computer-implemented processing. Thus, instructions executed on computers or other programmable devices provide steps for implementing functions specified in one or more processes and/or boxes of a flow chart.

It should be noted and understood that the division of the above modules is only a division of logical functions, which may be fully or partially integrated into a physical entity or physically separated in actual implementations. These modules may all be implemented in the form of software called by processing elements; or may all be implemented in the form of hardware; or, some modules may be implemented in the form of software called by processing elements, and some modules may be implemented in the form of hardware. For example, the determination module may be a separate processing element, or may be integrated into a certain chip of the above device, or, may be stored in the memory of the above device in the form of program code, and a certain processing element of the above device may call and execute the functions of the determination. Other modules have similar implementations. In addition, all or part of these modules may be integrated together, and may be implemented independently. The processing element mentioned here may be an integrated circuit with signal processing capability. In the implementation process, the various steps of the above method or the above various modules may be implemented by an integrated logic circuit in hardware form in elements of a processor or instructions in the form of software.

For example, the various modules, units, subunits or submodules may be one or more integrated circuits configured to implement the above methods, such as one or more application specific integrated circuits (Application Specific Integrated Circuit, ASIC), or one or more microprocessors (Digital Signal Processor, DSP), or one or more field programmable gate arrays (Field Programmable Gate Array, FPGA), etc. As another example, when a module described above is implemented in the form of scheduling program codes by a processing element, the processing element may be a general purpose processor, such as a central processing unit (Central Processing Unit, CPU) or other processors that may call program codes. As another example, these modules may be integrated together and implemented as a system-on-a-chip (system-on-a-chip, SOC).

Terms such as "first" and "second" in the specification and the claims of the present disclosure are used to distinguish similar objects and are not necessarily used to describe a specific order or sequence. It should be understood that the terms used in this way may be interchanged under appropriate circumstances, so that the embodiments of the present application described herein may be implemented in a sequence other than those illustrated or described herein. In addition, terms such as "including" and "having" and any variations thereof are intended to cover non-exclusive inclusion. For example, a process, method, system, product or device including a series of steps or units is not limited to the steps or units that are clearly listed and may include other steps or units that are not clearly listed or are inherent to the process, method, product, or device. Moreover, the term "and/or" used in the specification and the claims indicates involving at least one of connected objects, for example, A and/or B and/or C means 7 situations including: A alone, B alone, C alone, both A and B, both B and C, both A and C, and all of A, B and C. Similarly, the use of "at least one of A and B" in this specification and claims should be understood as "A alone, B alone, or both A and B".

Apparently, a person of ordinary skills in the art can make various modifications and variations to this disclosure without departing from the spirit and scope of this disclosure. In this way, if these modifications and variations of the present disclosure fall within the scope of the claims and their equivalent technologies, the present disclosure also intends to include these modifications and variations.

What is claimed is:

1. A method for PUCCH transmission, comprising:

determining, by a terminal, a first time unit for a physical uplink control channel PUCCH transmission on a first carrier;

determining, by the terminal, a second time unit for the PUCCH transmission on a second carrier based on the first time unit; and transmitting, by the terminal, a PUCCH in the second time unit on the second carrier, wherein the terminal is configured or allowed to perform PUCCH carrier switching between the first carrier and the second carrier;

a subcarrier spacing SCS of the second carrier is larger than or equal to a SCS of the first carrier.

2. The method according to claim 1, wherein the determining the second time unit for the PUCCH transmission on the second carrier based on the first time unit comprises one of the following:

determining a time unit on the second carrier that overlaps with the first time unit as the second time unit;

determining a target time unit of time units on the second carrier that overlap with the first time unit as the second time unit;

determining the second time unit based on indication information of a first indication field of downlink control information DCI corresponding to a PUCCH that requires carrier switching; or determining the second time unit based on pre-configured information of the first time unit.

3. The method according to claim 2, wherein the target time unit comprises one of the following:

a first one of the time units that overlap with the first time unit;

a last one of the time units that overlap with the first time unit;

a first one of time units that overlap with the first time unit and comprise available PUCCH resources;

a last one of time units that overlap with the first time unit and comprise available PUCCH resources;

a time unit that overlaps with the first time unit and overlaps with a starting symbol of the PUCCH on the first carrier;

a time unit that overlaps with the first time unit and overlaps with a starting time of the PUCCH on the first carrier;

a time unit that overlaps with the first time unit and overlaps with an ending symbol of the PUCCH on the first carrier;

a time unit that overlaps with the first time unit and overlaps with an ending time of the PUCCH on the first carrier;

a first one of time units that overlap with the first time unit and overlap with at least one symbol in a symbol set occupied by the PUCCH on the first carrier; or a last one of time units that overlap with the first time unit and overlap with at least one symbol in a symbol set occupied by the PUCCH on the first carrier;

or, wherein the indication information of the first indication field comprises one of the following:

information of the second time unit;

a time-domain offset relative to a time-domain position of the PUCCH on the first carrier; or a time-domain offset relative to the first time unit of the first carrier;

or, wherein the pre-configured information of the first time unit comprises one of the following:

information of the second time unit;

a time-domain offset relative to a time-domain position of the PUCCH on the first carrier; or a time-domain offset relative to the first time unit of the first carrier.

4. The method according to claim 3, wherein the available PUCCH resource is a PUCCH resource that meets a first condition;

the first condition comprises at least one of the following:

not overlapping with downlink symbols of the second carrier;

not overlapping with symbols occupied by a synchronization signal and physical broadcast channel PBCH block SSB on the second carrier;

not overlapping, in a time domain, with an uplink transmission on the second carrier that is configured by higher-layer signaling;

not overlapping, in a frequency domain, with the uplink transmission on the second carrier that is configured by the higher-layer signaling; or meeting a requirement of a preparation time for information carried by the PUCCH.

5. The method according to claim 1, wherein a unit of the first time unit is the same as a unit of the second time unit; or the quantity of symbols contained in the first time unit is less than or equal to the quantity of symbols contained in the second time unit.

6. A method for PUCCH transmission, comprising:

determining, by a network-side device, a first time unit for a physical uplink control channel PUCCH transmission on a first carrier;

determining, by the network-side device, a second time unit for the PUCCH transmission on a second carrier based on the first time unit; and receiving, by the network-side device, a PUCCH from a terminal in the second time unit on the second carrier, wherein the terminal is configured or allowed to perform PUCCH carrier switching between the first carrier and the second carrier;

a subcarrier spacing SCS of the second carrier is larger than or equal to a SCS of the first carrier.

7. The method according to claim 6, wherein the determining the second time unit for the PUCCH transmission on the second carrier based on the first time unit comprises one of the following:

determining a time unit on the second carrier that overlaps with the first time unit as the second time unit;

determining a target time unit of time units on the second carrier that overlap with the first time unit as the second time unit;

determining the second time unit based on indication information of a first indication field of downlink control information DCI corresponding to a PUCCH that requires carrier switching; or determining the second time unit based on pre-configured information of the first time unit.

8. The method according to claim 7, wherein the target time unit comprises one of the following:

a first one of the time units that overlap with the first time unit;

a last one of the time units that overlap with the first time unit;

a first one of time units that overlap with the first time unit and comprise available PUCCH resources;

a last one of time units that overlap with the first time unit and comprise the available PUCCH resources;

a time unit that overlaps with the first time unit and overlaps with a starting symbol of the PUCCH on the first carrier;

a time unit that overlaps with the first time unit and overlaps with a starting time of the PUCCH on the first carrier;

a time unit that overlaps with the first time unit and overlaps with an ending symbol of the PUCCH on the first carrier;

a time unit that overlaps with the first time unit and overlaps with an ending time of the PUCCH on the first carrier;

a first one of time units that overlap with the first time unit and overlap with at least one symbol in a symbol set occupied by the PUCCH on the first carrier; or a last one of time units that overlap with the first time unit and overlap with at least one symbol in a symbol set occupied by the PUCCH on the first carrier;

or, wherein the indication information of the first indication field comprises one of the following:

information of the second time unit;

a time-domain offset relative to a time-domain position of the PUCCH on the first carrier; or a time-domain offset relative to the first time unit of the first carrier;

or, wherein the pre-configured information of the first time unit comprises one of the following:

information of the second time unit;

a time-domain offset relative to a time-domain position of the PUCCH on the first carrier; or a time-domain offset relative to the first time unit of the first carrier.

9. The method according to claim 8, wherein the available PUCCH resource is a PUCCH resource that meets a first condition;

the first condition comprises at least one of the following:

not overlapping with downlink symbols of the second carrier;

not overlapping with symbols occupied by a synchronization signal and physical broadcast channel PBCH block SSB on the second carrier;

not overlapping, in a time domain, with an uplink transmission on the second carrier that is configured by higher-layer signaling;

not overlapping, in a frequency domain, with the uplink transmission on the second carrier that is configured by the higher-layer signaling; or meeting a requirement of a preparation time for information carried by the PUCCH.

10. The method according to claim 6, wherein a unit of the first time unit is the same as a unit of the second time unit; or the quantity of symbols contained in the first time unit is less than or equal to the quantity of symbols contained in the second time unit.

11. A network-side device, comprising a memory, a transceiver and a processor, wherein the memory is configured to store a computer program; the transceiver is configured to transmit and receive data under control of the processor; and the processor is configured to read the computer program in the memory to perform steps in the method for PUCCH transmission according to claim 6.

12. The network-side device according to claim 11, wherein the determining the second time unit for the PUCCH transmission on the second carrier based on the first time unit comprises one of the following:

determining a time unit on the second carrier that overlaps with the first time unit as the second time unit;

determining a target time unit of time units on the second carrier that overlap with the first time unit as the second time unit;

determining the second time unit based on indication information of a first indication field of downlink control information DCI corresponding to a PUCCH that requires carrier switching; or determining the second time unit based on pre-configured information of the first time unit.

13. The network-side device according to claim 12, wherein the target time unit comprises one of the following:

a first one of the time units that overlap with the first time unit;

a last one of the time units that overlap with the first time unit;

a first one of time units that overlap with the first time unit and comprise available PUCCH resources;

a last one of time units that overlap with the first time unit and comprise the available PUCCH resources;

a time unit that overlaps with the first time unit and overlaps with a starting symbol of the PUCCH on the first carrier;

a time unit that overlaps with the first time unit and overlaps with a starting time of the PUCCH on the first carrier;

a time unit that overlaps with the first time unit and overlaps with an ending symbol of the PUCCH on the first carrier;

a time unit that overlaps with the first time unit and overlaps with an ending time of the PUCCH on the first carrier;

a first one of time units that overlap with the first time unit and overlap with at least one symbol in a symbol set occupied by the PUCCH on the first carrier; or a last one of time units that overlap with the first time unit and overlap with at least one symbol in a symbol set occupied by the PUCCH on the first carrier;

or, wherein the indication information of the first indication field comprises one of the following:

information of the second time unit;

a time-domain offset relative to a time-domain position of the PUCCH on the first carrier; or a time-domain offset relative to the first time unit of the first carrier;

or, wherein the pre-configured information of the first time unit comprises one of the following:

information of the second time unit;

a time-domain offset relative to a time-domain position of the PUCCH on the first carrier; or a time-domain offset relative to the first time unit of the first carrier.

14. The network-side device according to claim 13, wherein the available PUCCH resource is a PUCCH resource that meets a first condition;

the first condition comprises at least one of the following:

not overlapping with downlink symbols of the second carrier;

not overlapping with symbols occupied by a synchronization signal and physical broadcast channel PBCH block SSB on the second carrier;

not overlapping, in a time domain, with an uplink transmission on the second carrier that is configured by higher-layer signaling;

not overlapping, in a frequency domain, with the uplink transmission on the second carrier that is configured by the higher-layer signaling; or meeting a requirement of a preparation time for information carried by the PUCCH.

15. The network-side device according to claim 11, wherein a unit of the first time unit is the same as a unit of the second time unit; or the quantity of symbols contained in the first time unit is less than or equal to the quantity of symbols contained in the second time unit.

16. A terminal, comprising a memory, a transceiver and a processor, wherein the memory is configured to store a computer program; the transceiver is configured to transmit and receive data under control of the processor; and the processor is configured to read the computer program in the memory to perform following operations:

determining a first time unit for a physical uplink control channel PUCCH transmission on a first carrier; and determining a second time unit for the PUCCH transmission on a second carrier based on the first time unit;

the transceiver is configured to transmit a PUCCH in the second time unit on the second carrier, wherein the terminal is configured or allowed to perform PUCCH carrier switching between the first carrier and the second carrier;

a subcarrier spacing SCS of the second carrier is larger than or equal to a SCS of the first carrier.

17. The terminal according to claim 16, wherein the determining the second time unit for the PUCCH transmission on the second carrier based on the first time unit comprises one of the following:

determining a time unit on the second carrier that overlaps with the first time unit as the second time unit;

determining a target time unit of time units on the second carrier that overlap with the first time unit as the second time unit;

determining the second time unit based on indication information of a first indication field of downlink control information DCI corresponding to a PUCCH that requires carrier switching; or determining the second time unit based on pre-configured information of the first time unit.

18. The terminal according to claim 17, wherein the target time unit comprises one of the following:

a first one of the time units that overlap with the first time unit;

a last one of the time units that overlap with the first time unit;

a first one of time units that overlap with the first time unit and comprise available PUCCH resources;

a last one of time units that overlap with the first time unit and comprise the available PUCCH resources;

a time unit that overlaps with the first time unit and overlaps with a starting symbol of the PUCCH on the first carrier;

a time unit that overlaps with the first time unit and overlaps with a starting time of the PUCCH on the first carrier;

a time unit that overlaps with the first time unit and overlaps with an ending symbol of the PUCCH on the first carrier;

a time unit that overlaps with the first time unit and overlaps with an ending time of the PUCCH on the first carrier;

a first one of time units that overlap with the first time unit and overlap with at least one symbol in a symbol set occupied by the PUCCH on the first carrier; or a last one of time units that overlap with the first time unit and overlap with at least one symbol in a symbol set occupied by the PUCCH on the first carrier;

or, wherein the indication information of the first indication field comprises one of the following:

information of the second time unit;

a time-domain offset relative to a time-domain position of the PUCCH on the first carrier; or a time-domain offset relative to the first time unit of the first carrier;

or, wherein the pre-configured information of the first time unit comprises one of the following:

information of the second time unit;

a time-domain offset relative to a time-domain position of the PUCCH on the first carrier; or a time-domain offset relative to the first time unit of the first carrier.

19. The terminal according to claim 18, wherein the available PUCCH resource is a PUCCH resource that meets a first condition;

the first condition comprises at least one of the following:

not overlapping with downlink symbols of the second carrier;

not overlapping with symbols occupied by a synchronization signal and physical broadcast channel PBCH block SSB on the second carrier;

not overlapping, in a time domain, with an uplink transmission on the second carrier that is configured by higher-layer signaling;

not overlapping, in a frequency domain, with the uplink transmission on the second carrier that is configured by the higher-layer signaling; or meeting a requirement of a preparation time for information carried by the PUCCH.

20. The terminal according to claim 16, wherein a unit of the first time unit is the same as a unit of the second time unit; or the quantity of symbols contained in the first time unit is less than or equal to the quantity of symbols contained in the second time unit.

* * * * *